United States Patent
Golubev et al.

(10) Patent No.: US 9,625,913 B2
(45) Date of Patent: Apr. 18, 2017

(54) SYSTEM AND METHOD FOR ROBUST NONLINEAR REGULATION CONTROL OF UNMANNED AERIAL VEHICLES SYNTHETIC JET ACTUATORS

(71) Applicant: Embry-Riddle Aeronautical University, Inc., Daytona Beach, FL (US)

(72) Inventors: Vladimir V. Golubev, Ponce Inlet, FL (US); William MacKunis, Daytona Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 3 days.

(21) Appl. No.: 14/963,827

(22) Filed: Dec. 9, 2015

(65) Prior Publication Data
US 2016/0209850 A1    Jul. 21, 2016

Related U.S. Application Data

(60) Provisional application No. 62/124,146, filed on Dec. 9, 2014.

(51) Int. Cl.
*B64C 15/00* (2006.01)
*B64C 15/02* (2006.01)
(Continued)

(52) U.S. Cl.
CPC ........... *G05D 1/0825* (2013.01); *B64C 15/14* (2013.01); *B64C 39/024* (2013.01);
(Continued)

(58) Field of Classification Search
CPC combination set(s) only.
See application file for complete search history.

(56) References Cited

U.S. PATENT DOCUMENTS 5,758,823 A  *  6/1998  Glezer ................... B64C 21/08
                                                              239/11
5,988,522 A  *  11/1999  Glezer ................... B64C 21/08
                                                               239/11
(Continued)

OTHER PUBLICATIONS

Luo, Zhen-Bing, Xia, Zhi-Xun; Zhao, Jian-Min; Miao, Wan-Bo, Wang, De-Quan,(Institute of Aerospace and Material Engineering, National University of Defence Technology, Changsha 410072, China),"Numerical Simulation of Synthetic Jet Flow Field and Parameter Analysis of Actuator", Journal of Propulsion Technology, 2004-2003,    pp.    1-3,    http://en.cnki.com.cn/Article_en/CJFDTOTAL-TJJS200403003.htm.
(Continued)

*Primary Examiner* — Yonel Beaulieu
(74) *Attorney, Agent, or Firm* — Womble Carlyle Sandridge & Rice, LLP

(57) ABSTRACT

An unmanned aerial vehicle (UAV) is provided with a plurality of synthetic jet actuators and a nonlinear robust controller. The controller compensates for uncertainty in a mathematic model that describes the function of the synthetic jet actuators. Compensation is provided by the use of constant feedforward best guess estimates that eliminate the need for more highly computationally burdensome approaches such as the use of time-varying adaptive parameter estimation algorithms.

9 Claims, 38 Drawing Sheets

(51) Int. Cl.
  *B64C 15/14* (2006.01)
  *B64C 39/00* (2006.01)
  *G05D 1/00* (2006.01)
  *G05D 1/08* (2006.01)
  *B64C 39/02* (2006.01)
  *G05D 1/10* (2006.01)

(52) U.S. Cl.
  CPC ........... *B64C 39/028* (2013.01); *G05D 1/101* (2013.01); *B64C 2201/028* (2013.01); *B64C 2201/104* (2013.01); *B64C 2230/18* (2013.01); *Y02T 50/166* (2013.01)

(56) References Cited

U.S. PATENT DOCUMENTS

| | | | |
|---|---|---|---|
| 6,056,204 A * | 5/2000 | Glezer | B64C 21/08 239/101 |
| 6,412,732 B1 | 7/2002 | Amitay et al. | |
| 6,457,654 B1 | 10/2002 | Glezer et al. | |
| 6,644,598 B2 | 11/2003 | Glezer et al. | |
| 6,796,533 B2 | 9/2004 | Barrett et al. | |
| 7,255,309 B2 | 8/2007 | Boldrin et al. | |
| 7,823,839 B2 | 11/2010 | Glezer et al. | |
| 8,006,939 B2 * | 8/2011 | McClure | B64C 23/005 244/130 |
| 8,128,036 B2 | 3/2012 | Boldrin et al. | |
| 8,290,724 B2 | 10/2012 | Darbin et al. | |
| 8,944,370 B2 * | 2/2015 | Khozikov | F03H 1/0012 244/73 R |
| 2008/0002190 A1 * | 1/2008 | Romain | G01C 21/005 356/139.01 |
| 2009/0090815 A1 * | 4/2009 | Massimo | F03D 3/005 244/155 A |
| 2010/0140416 A1 * | 6/2010 | Ohanian, III | B64C 21/04 244/23 A |
| 2015/0225081 A1 * | 8/2015 | Stabler | B64C 39/024 701/3 |

OTHER PUBLICATIONS

Mackunis, W., Subramanian, S., Mehta, S., Ton, C., Curtis, J.W., and Reyhanoglu, M., "Robust Nonlinear Aircraft Tracking Control Using Synthetic Jet Actuators," pp. 220-225, Department of Physical Sciences, Embry-Riddle Aeronautical University, Daytona Beach, FL 32114, University of Florida Research and Engineering Education Facility, Shalimar, FL, 32547, Munitions Directorate, Air Force Research Laboratory, Eglin AFB, FL 32542, 52$^{nd}$ IEEE Conference on Decision and Control, Dec. 10-13, 2013, Florence, Italy.

"Rugged Synthetic Jet Actuators for Practical Flight Control Applications", Award Information, Barron Associates, Inc. 1410 Sachem Place Suite 202, Charlottesville, VA 22901-2496; https://www.sbir.gov/sbirsearch/detail/104311.

* cited by examiner

SYSTEM AND METHOD FOR ROBUST NONLINEAR REGULATION CONTROL OF UNMANNED AERIAL VEHICLES SYNTHETIC JET ACTUATORS

CROSS REFERENCE TO RELATED APPLICATIONS

The present patent application is a formalization of previously filed, U.S. Provisional Patent Application Ser. No. 62/124,146, filed Dec. 9, 2014 by the inventors named in the present application. This patent application claims the benefit of the filing date of this cited Provisional Patent Application according to the statutes and rules governing provisional patent applications, particularly 35 U.S.C. §119(e), and 37 C.F.R. §§1.78(a)(3) and 1.78(a)(4). The specification and drawings of the Provisional Patent Application referenced above are specifically incorporated herein by reference as if set forth in their entirety.

FIELD OF THE INVENTION

The present invention generally relates to a flight control system for selective operation of an array of synthetic jet micro-actuators employed on an unmanned aerial vehicle.

BACKGROUND

There has been a surge of interest in the design and application of unmanned aerial vehicles (UAVs), particularly fixed wing micro-air vehicles (MAV). UAVs can be used in numerous civilian applications, such as urban reconnaissance, package delivery, and area mapping. UAVs are utilized in various military applications as well. While some UAVs require human operators remotely controlling the operation and/or flight path of the UAV, other UAV's have been designed for autonomous operation. One of the biggest challenges involved in the autonomous operation of UAVs is in the design of flight tracking controllers for UAVs, which often operate in uncertain and possibly adverse conditions.

Flight tracking controllers should provide the UAV, operating autonomously, with the ability to remain within an acceptable range of their intended flight path while operating in an uncertain environment caused by, for example, changing wind velocity and direction resulting in gusts, vortical structures and turbulence.

Additionally, suppression of limit cycle oscillations (LCO) (or flutter) is another concern in UAV tracking control design. This is especially true for applications involving smaller, lightweight UAVs, where the aircraft wings are more susceptible to LCO. LCO refers to "flutter" behaviors in UAV wings that manifest themselves as constant-amplitude oscillations, which result from nonlinearities inherent in the aeroelastic dynamics of the UAV system. Note that LCOs may significantly affect the aerodynamic properties of an aircraft, and can be especially devastating for small UAVs interacting with impinging gusts with amplitudes comparable to the vehicle speed. Indeed, the gust-induced wing dynamics results in lift, drag, and pitching-moment oscillations deteriorating the aircraft aerodynamic performance and posing severe challenges to aircraft flight stability. Due to these behaviors, the LCO could surpass the safe flight boundaries of an aircraft and could potentially lead to structural damage causing the UAV to crash.

These engineering challenges necessitate the utilization of UAV flight controllers, which achieve accurate flight tracking in the presence of dynamic uncertainty while simultaneously suppressing LCO. Control applications for LCO suppression have been developed using mechanical deflection surfaces (e.g., flaps, ailerons, rudders, and elevators). However, when dealing with smaller UAVs, practical engineering considerations and physical constraints can preclude the addition of the large, heavy moving parts that generally are required for installation of deflection surfaces.

Due to their small size, ease of operation, and low cost, synthetic jet actuators (SJA) are promising tools for aircraft tracking control and flow control applications. SJA's transfer linear momentum to a flow system by using a vibrating diaphragm, which creates trains of vortices through the alternating ejection and suction of fluid through a small orifice. Since these vortices (i.e., jets) are formed entirely from the fluid (i.e., air) of the flow system, a key benefit of SJA is that they achieve this transfer of momentum with zero net mass injection across the flow boundary. Thus, SJAs do not require space for a fuel supply. SJAs can be utilized to modify the boundary layer flow field near the surface of an aircraft wing, which can improve aerodynamic performance. Moreover, synthetic jet actuators can expand the usable range of angle of attack, which can improve maneuverability. In addition to flow control applications, arrays consisting of several SJAs can be employed to achieve tracking control of aircraft, possibly eliminating the need for mechanical control surfaces. The benefits of utilizing SJAs on aircraft as opposed to mechanical control surfaces include reduced cost, weight, and mechanical complexity.

SJAs have been developed with the capability to achieve momentum transfer with zero-net mass-flux. This beneficial feature eliminates the need for an external fuel supply, since the working substance is simply the gas (i.e., air) that is already present in the environment of operation. This makes SJAs an attractive option in UAV applications, because of the significant reduction in the size of the required equipment. The SJAs synthesize the jet flow through the alternating suction and ejection of fluid through an aperture, which is produced via pressure oscillations in a cavity. The pressure oscillations can be generated using various methods, including pistons in the SJA's orifices or piezoelectric diaphragms. SJA's can achieve boundary-layer flow control near the surface of a UAV wing since they can provide instant actuation, unlike conventional mechanical control surfaces. In addition, SJA's can expand the usable range of angle of attack, resulting in improved UAV maneuverability.

FIGS. 1 and 2 show an example UAV 100 with a seamless fixed wing construction. The UAV 100 includes an airframe 102 and an array of synthetic jet actuators 104 disposed at selected locations around the periphery of the wing of the airframe 102. FIG. 3 schematically illustrates a synthetic jet actuator 104. The SJA includes a cavity 106, a membrane 108, also called a diaphragm, and an outlet orifice 110. The SJA 104 is provided with a voltage to cause the membrane 108 to oscillate, resulting in a time averaged pulsed jet of air being emitted from the orifice 110. The magnitude of the voltage applied to the SJA 104 may impact the flex or force of air expelled from the orifice 110. Under certain conditions, a series of vortex rings 112 formed during the expulsion phase are able to escape the reverse injection and convect away from the orifice as a time-averaged jet capable of manipulating the flight path of the airframe 102 and/or the flow of air affecting the airframe 102.

Use of SJA present challenges in control design due to uncertainties inherent in the dynamics of their operation. Specifically, the input-output (i.e., the control voltage to force delivered) characteristic of each SJA is nonlinear and contains parametric uncertainty. To compensate for this uncertainty, recently developed SJA-based control systems utilize online adaptive control algorithms, neural networks, and/or complex fluid dynamics computations in the feedback loop. FIG. 4 schematically illustrates one control system 200 that the present disclosure seeks to improve. Particularly, the control system 200 includes a processor 202 configured to generate a control command to a set of UAV system dynamics 204, such as an array of synthetic jet actuators. The processor 202 determines the controller command based on part on sensor measurements 206 which form a first feedback loop 208 to the processor 202. The instant control system 200 is characterized by the use of an adaptive parameter update law 210, effectively requiring a second feedback loop 212 such that the processor 202 generates the controller command based on a control law which is required to adapt or update itself with each iteration. However, implementation of these computationally burdensome control techniques, i.e., the adaptive parameter update law 210 and second feedback loop 212 requires additional computational resources (e.g., microprocessors, timer circuits, and/or time-consuming processing algorithms), which might not be available for smaller UAV applications with limited onboard space and computing power. Moreover, the computational complexity in these control system designs results in a slower control response rate, which can hinder control performance or even cause catastrophic failures.

SUMMARY

In one embodiment, the present disclosure provides a robust flight controller to achieve accurate trajectory tracking for an unmanned aerial vehicle equipped with an array of synthetic jet actuators over a wide envelope of actuator uncertainty and aircraft operating conditions. This disclosure suggests the use of a robust, continuous Lyapunov-based controller that includes a novel implicit learning characteristic.

The present disclosure includes an improved control system configured to achieve UAV tracking control performance that is comparable to adaptive or neural network-based methods with a reduction in the required computational resources (i.e. less expensive) and a faster response time. The control system may require only a single sensor feedback measurement loop. By eliminating an adaptive parameter feedback generally found in comparable systems, the control system of the present disclosure is more suitable for applications involving small UAVs with limited onboard space and computing power. Further, the simplicity in the disclosed control design endows the system with a faster control response rate, which results in more reliable UAV flight in unpredictable, time-varying flight conditions.

The present disclosure includes an unmanned aerial vehicle (UAV), comprising: an airframe, a plurality of synthetic jet actuators (SJA) affixed to the airframe, a plurality of sensors configured to determine an operating condition of the UAV, and a control system. Each SJA is configured to selectively produce a stream of air in response to a control command input thereto, each SJA being represented by a mathematical model having at least two uncertain parameters. The control system is configured to provide the control command to each of the plurality of synthetic jet actuators based on the operating condition of the UAV and a control law, the control law including a constant estimate for each of the uncertain parameters in the mathematical model of each corresponding SJA. The control system controls at least one or both of the trajectory of the UAV and the vibration of the UAV by activating at least one of the plurality of SJA with the control command.

The present disclosure also includes a control system for determining a control command usable by a synthetic jet actuator to at least one of, adjust a trajectory of an unmanned aerial vehicle, or suppress limit cycle oscillations of the unmanned aerial vehicle. The control system comprises a processor programmed to run a control law, the control law comprising a feedback term determined based on measurements from at least one sensor, and a constant estimation of at least two uncertain parameters necessitated by use of the synthetic jet actuator, which is represented by a mathematical model having at least two uncertain parameters. The control system is designed such that the control law is substantially free from time-varying adaptive parameter estimation algorithms.

The present disclosure also includes a method of controlling a micro air vehicle. The method comprises measuring at least one of roll rate, pitch rate, yaw rate, pitching rate, and plunging rate. The method may comprise comparing the measured value with a desired reference value to determine an error. The method may further comprise determining a control command voltage based on a control law having constant estimates and an error variable term. The method may include applying the control command voltage to a synthetic jet actuator of a plurality of synthetic jet actuators, and emitting a flow of air from the synthetic jet actuator to adjust the trajectory of the micro air vehicle.

DISCUSSION OF INVENTION

The present invention is directed to a nonlinear robust controller method of control for operating synthetic jet actuators (SJA) used as part of unmanned aerial vehicles (UAV). In one embodiment, the SJA are configured for operation to assist with tracking of the UAV. In another embodiment, the use of the SJA may be configured to substantially suppress limit cycle oscillations (LCO) in unmanned aerial vehicle (UAV) systems with uncertain dynamics. In each embodiment, the controller method seeks to achieve accurate flight control in the presence of SJA non-linearities, parametric uncertainty and external disturbances (e.g., wind gusts). Particularly, the control method utilizes a control law that is continuous, making the method amenable to practical applications of small UAV, sometimes referred to as micro air vehicles (MAV). Moreover, the control method presented herein is designed to be inexpensively implemented, requiring no online adaptive laws, function approximators, or complex fluid dynamics computations in the feedback loop. A matrix decomposition technique is utilized along with innovative manipulation in the error system development to compensate for the dynamic SJA uncertainty. The robust controller is designed with an implicit learning law, which is shown to compensate for bounded disturbances. A Lyapunov-based stability analysis is utilized to prove global asymptotic trajectory tracking in the presence of external disturbances, actuator nonlinearities, and parametric uncertainty in the system and actuator dynamics. Numerical simulation results are provided to complement the theoretical development. A salient feature of the robust control laws disclosed by this description is that their structure is continuous, and enables bounded disturbances to be asymptotically rejected without the need for infinite bandwidth. In one embodiment, a rigorous Lyapunov-based stability analysis is utilized to prove asymptotic pitching and plunging regulation, considering a detailed dynamic model of the pitching and plunging dynamics.

Figure 1:
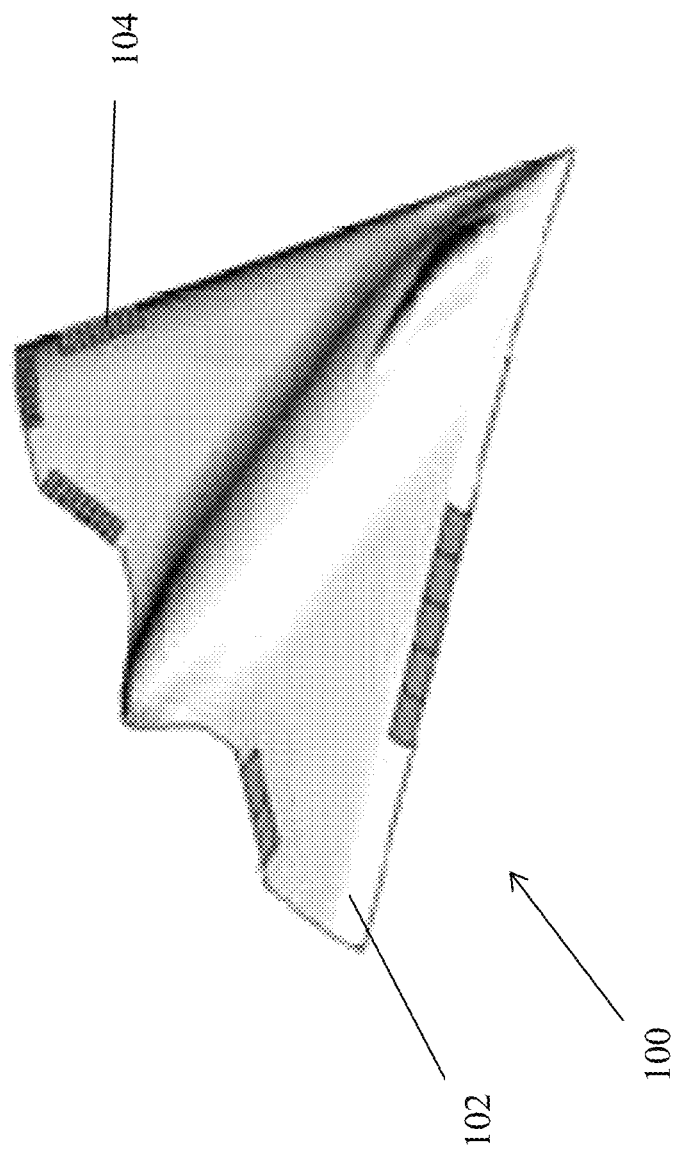
FIG. 1 is a perspective schematic of an example unmanned aerial vehicle (UAV) equipped with an array of synthetic jet actuators (SJAs).
Figure 2:
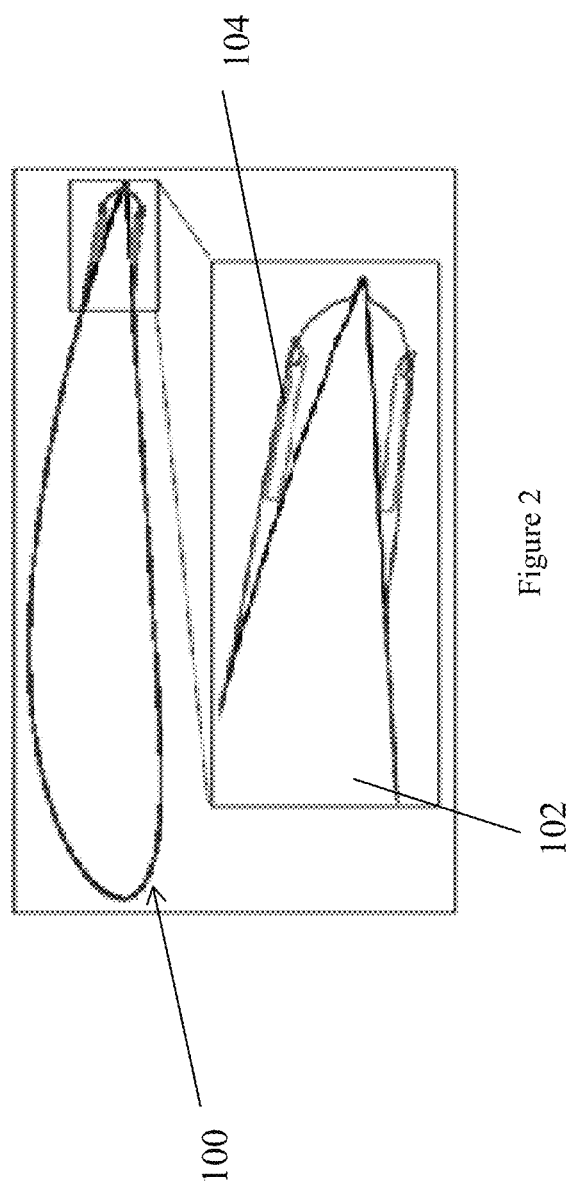
FIG. 2 is a side view schematic of an example arrangement of SJAs on the trailing edge of a wing of the UAV of FIG. 1.
Figure 3:
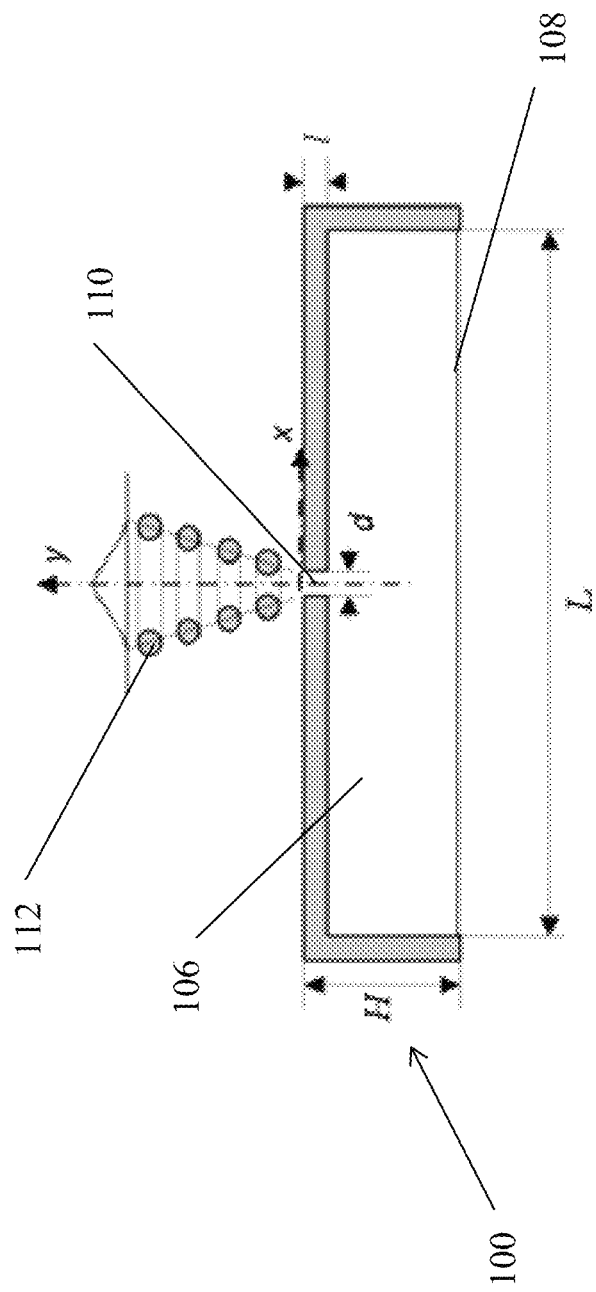
FIG. 3 is a schematic example of a SJA.
Figure 4:
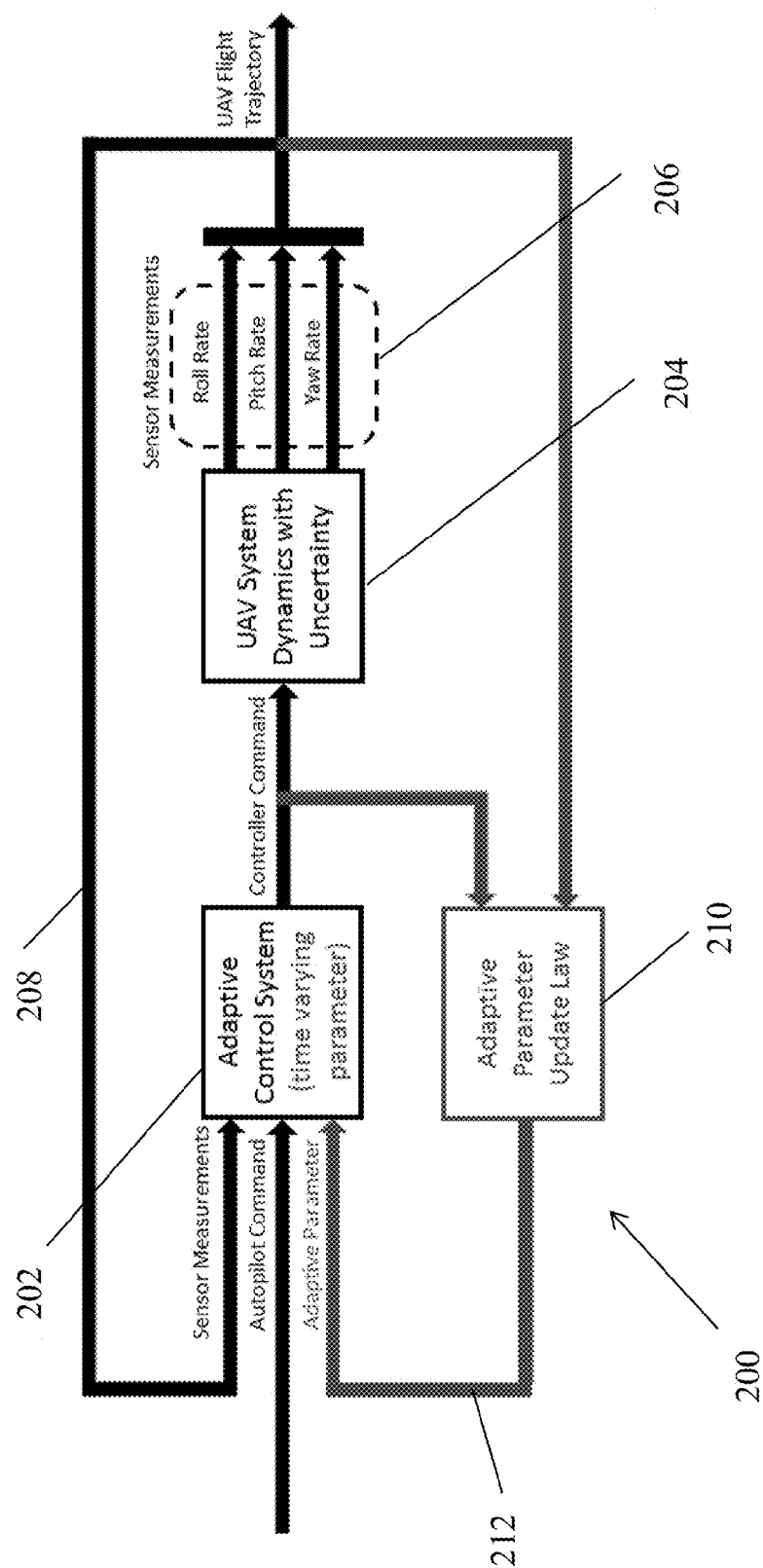
FIG. 4 is a diagrammatic representation of a conventional control system for the UAV of FIG. 1.
Figure 5:
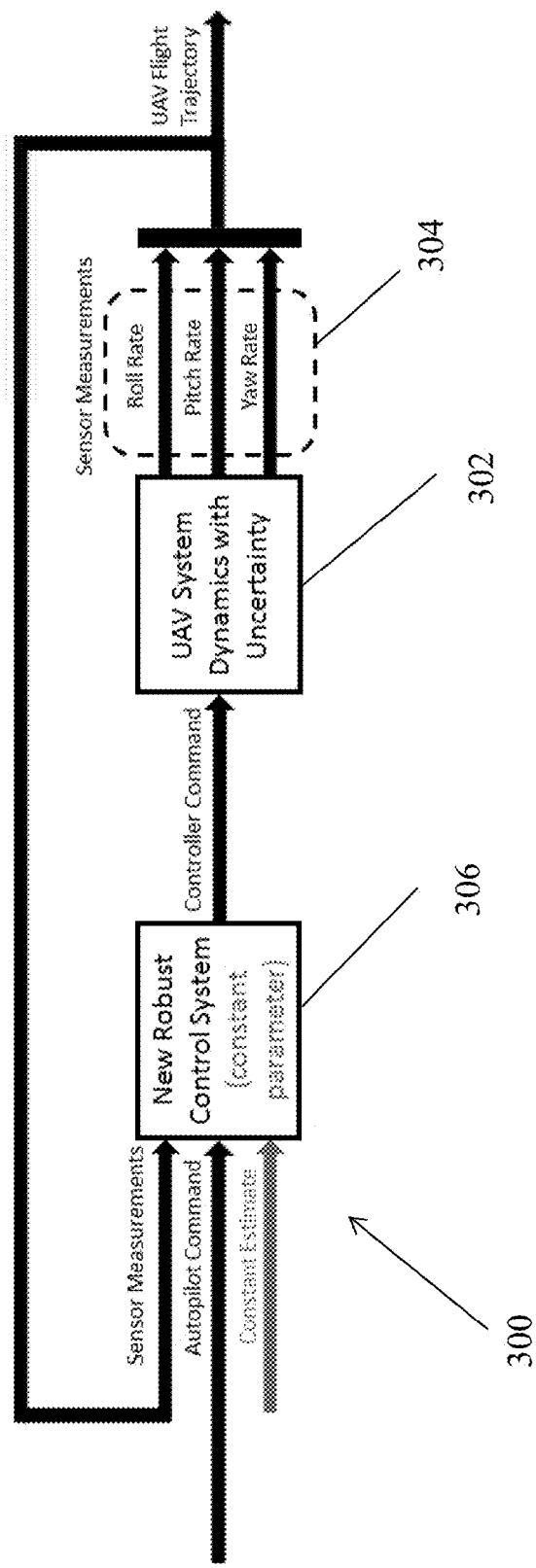
FIG. 5 is a diagrammatic representation of a control system for the UAV of FIG. 1 according to embodiments of the present disclosure.

FIG. 5 schematically illustrates an aircraft control system 300 according to an embodiment of the present disclosure. The aircraft control system 300 may be configured for tracking along a predetermined flight path. In another embodiment, the aircraft control system 300 may be used to prevent limit cycle oscillations. The control system 300 is intended for use with a micro air vehicle (e.g. an unmanned aerial vehicle) having an airframe (see FIG. 1) and an actuation system 302, for example an array of synthetic jet actuators (see FIGS. 1-3). The airframe may include a plurality of sensors 304 configured to measure parameters of the airframe that impact the operation of the UAV. In one example, the sensors 304 may determine at least one, and potentially all three of the roll rate, pitch rate, and yaw rate of the airframe to be used to control tracking along a predetermined desired flight path. The sensors 304 may function based on displacement or acceleration in alternative to rates. Where LCO is being controlled, the motion of the airframe to be sensed may be the pitching and/or plunging action of the wings. The control system 300 also includes a controller 306 configured to provide a controller command, such as a peak-to-peak voltage, to selectively excite operation of the actuation system 302. The controller 306 may include a processor or a microprocessor configured to execute a control implementation and analysis law for determining the appropriate controller command. The control law may be configured to require input from the sensors 304 as the primary dynamic parameters. The sensed parameters provided by the sensors 304 may be compared to a predetermined desired reference condition. When attempting to control LCO, the desired reference condition could be a steady state, i.e. zero pitch or plunge rate. When tracking, the predetermined desired reference conditions may vary as the UAV is expected to follow a predetermined set of maneuvers. The remainder of the inputs used to execute the control law are intended to be constant, best-guess estimates of uncertain parameters. In other words, the control law does not function based upon the use of any time-varying adaptive parameter estimation algorithms.

Reiterating from above, use of SJA present challenges in control design due to uncertainties inherent in the dynamics of their operation. Specifically, the input-output (i.e., the control voltage to force delivered) characteristic of each SJA is nonlinear and contains parametric uncertainty. The uncertain aircraft dynamic model detailed herein contains parametric uncertainty due to linearization errors and un-modeled nonlinearities. Specifically, the aircraft system can be modeled via a linear time-invariant system as:

$$\dot{x} = Ax + B\mathcal{U} + f(x,t) \qquad (1)$$

where $A \in \mathbb{R}^{n \times n}$ denotes the uncertain state matrix, $B \in \mathbb{R}^{n \times n}$ represents the uncertain input matrix, and $f(x,t) \in \mathbb{R}^n$ is a state- and time-dependent unknown, nonlinear disturbance. For example, $f(x,t)$ could include exogenous disturbances (e.g., due to wind gusts) or nonlinearities not captured in the linearized dynamic model. The state vector x(t) may contain roll, pitch, and yaw rate measurements. Also in (1), the control input $$u(t) \triangleq [u_1(t) \ u_2(t) \ldots u_m(t)]^T \in \mathbb{R}^m$$

represents the virtual surface deflections due to m arrays of synthetic jet, actuators (SJA).

Based on experimental data, the dynamics of the SJA can be modeled as $$u_i = \theta_{2i}^* - \frac{\theta_{1i}^*}{v_i} \ i = 1, 2, \ldots, m \quad (2)$$

where $v_i(t) = A_{ppi}^2(t) \in \mathbb{R}$ denotes the peak-to-peak voltage acting, on the $i^{th}$ SJA array, and $\theta_{1i}^*$, $\theta_{2i}^* \in \mathbb{R}$ are unknown positive physical parameters. u is the virtual control surface deflection angle expressed in degrees. In a standard UAV, this would represent the angles of the elevator, aileron, and rudder. In this SJA application, it is the equivalent deflection angle that is generated by an SJA array. $v_i(t)$ is the peak-to-peak control input voltage to the SJA array expressed in volts for each SJA i=1–n. $\theta_{1i}^*$, $\theta_{2i}^*$ are uncertain constant parameters, which are inherent in the SJA actuator dynamics. Nominal values for these parameters have been obtained in previous research by Deb et al as $\theta_{1i}^*=33.33$ volt-deg and $\theta_{2i}^*=15$ degrees. These parameter values can fluctuate significantly depending on the UAV operating conditions, and the resulting parametric uncertainty is the primary challenge that must be addressed in SJA-based UAV control design.

Based on the uncertain SJA actuator model given in (2), the control input voltage is designed via the feedback control law $$v(t) = \frac{\hat{\theta}_1}{\hat{\theta}_2 - u_d(t)} \quad (3)$$

In Equation (3), $\hat{\theta}_1$, and $\hat{\theta}_2^*$ denote constant, best-guess estimates of the uncertain parameters $\theta_1^*$ and $\theta_2^*$, respectively. The use of constant estimates as opposed to time-varying adaptive estimates facilitates the improvements of the control system 300 of the present invention over the prior control system 200. Use of best guess estimates of the uncertain parameters enables the tracking control system 300 to eliminate the additional sensor feedback measurements and processing effort (i.e., the adaptive parameter update law) required by control system 200. $\hat{\theta}_1$ depends on physical and aerodynamic parameters, including wing chord, the freestream velocity, and additional physical parameters that lead to one level of uncertainty. An empirically determined expression for $\theta_1^*$ is $$\theta_1^* = \frac{p_2 p_3 (U_\infty)^3}{f c p_4},$$

where $U_\infty$ denotes the freestream velocity, $f$ is the frequency of the input voltage v(t), c is the local wing chord, and $p_2$, $p_3$, and $p_4$ denote uncertain constant physical parameters. In the original experimental research of Deb et al, the values of the parameters $p_2$, $p_3$, and $p_4$ were selected arbitrarily as a baseline model resulting in $\theta_1^*$ values consistent with those used in present simulations as found in Table 1, $\hat{\theta}_2$ may be estimated as the maximum deflection angle that can be achieved by an SJA. Presently, this is suggested to be about 15 degrees.

Also in Equation (3), $u_d(t)$ denotes an auxiliary control term, which incorporates the sensor feedback measurements (e.g., the roll, pitch, and yaw rates defining the UAV flight trajectory as shown in FIG. 5). After substituting Equation (3) into Equation (2) and considering Equation (1), it can be shown that the auxiliary control term $u_d(t)$ is pre-multiplied by an uncertain term $\Omega$ (a matrix in general) containing the uncertain parameter(s) $\theta_1^*$, the constant estimate(s) $\hat{\theta}_1$, and the elements of the uncertain input matrix B. It can further be shown that the elements of the uncertain matrix $\Omega$ contain the ratios $\theta_1^*/\hat{\theta}_1$ of the uncertain parameters to their estimates. To compensate for the uncertainty in $\Omega$, an estimate $\hat{\Omega}$ of $\Omega$ can be designed to be equivalent to the best guess estimate of the uncertain input matrix B in Equation (1).

By incorporating the estimate $\hat{\Omega}$, the control term $u_d(t)$ is designed as $$u_d(t) = \hat{\Omega}^\#(\mu_0(t) - \mu_1(t)) \quad (4)$$

where $\hat{\Omega}^\#$ denotes the pseudoinverse of $\hat{\Omega}$, $\mu_0(t)$ and $\mu_1(t)$ are functions of the UAV roll, pitch, and yaw rate tracking errors defined as $$\mu_0 = -(k_s + I_{n \times n})e(t) - (k_s + I_{n \times n})e(0) - \int_0^t \alpha(k_s + I_{n \times n})e(\tau)d\tau$$

$$\mu_1 = \int_0^t \beta \, sgn(e(\tau))d\tau. \quad (5)$$

The variables in Equation (5) are defined as follows:
- e(t) is the UAV trajectory tracking error expressed in degrees per second. Physically, this represents the difference between the actual sensor measurements from sensors 304 and the reference (desired) UAV trajectory, for example based on a predetermined flight plan. The actual sensor measurements are the roll, pitch, and yaw rate measurements as shown in FIG. 5. The UAV tracking control objective can be stated as e(t)→0.
- $\hat{\Omega}$ is a constant estimate of the parametric uncertainty resulting from the mismatch between the actual and estimated values of the uncertain SJA parameters.
- $k_s$, $\alpha$, $\beta$ are positive, constant, user-defined control gains (i.e., amplifier settings). The values of these parameters are utilized to finely 'tune' the performance of the closed-loop system in terms of control response rate and trajectory tracking accuracy, for example.

Thus by configuring the controller 306 to operate in accordance with the control law consistent with equations (3-5) above, and particularly consistent with equations (3) and (4) above, the control command (e.g. v(t)) may be determined based on A) constant values combined with B) the measured rates of motion (such as pitch, roll and yaw for flight path control) available from sensors 304 fed back to the controller 306 during operation of the tracking control system 300 and compared to C) a predetermined motion state. The predetermined motion state may be a predetermined expect flight path in the example of tracking control, or the predetermined motion state may be steady state in the example of limiting oscillations.

Example 1: Tracking Control Embodiments

Using the expressions in (2) and (1), the dynamics can be expressed in terms of the $i^{th}$ SJA array as $$\dot{x} = Ax + \Sigma_{i=1}^m b_i v_i + f(x,t). \quad (6)$$

In (6), $$b_i \triangleq [b_{1i} \; b_{2i} \; \ldots b_{ni}]^T \in \mathbb{R}^n \; \forall \; i = 1, 2, \ldots, m,$$

where $b_{ij}$ by denotes the $(i, j)^{th}$ element of the matrix B in (1).

Assumption 1: If $x(t) \in \mathcal{L}_\infty$, then $f(x,t)$ is bounded. Moreover, if $x(t) \in \mathcal{L}_\infty$, then the first and second partial derivatives of the elements of $f(x,t)$ with respect to $x(t)$ exist and are bounded.

A purely robust feedback control strategy can be utilized to compensate for the control input nonlinearity and input parametric uncertainty in (2). To this end, a robust inverse $v_i(t)$ is utilized, which contains constant feedforward "best-guess" estimates of the uncertain parameters $\theta_{1i}^*$ and $\theta_{2i}^*$. The robust inverse that compensates for the uncertain, jet array nonlinearities in (2) can be expressed as $$v_i(t) = \frac{\hat{\theta}_{1i}}{\hat{\theta}_{2i} - u_{di}(t)}, \; i = 1, \ldots, m \tag{7}$$

where $\hat{\theta}_{1i}, \hat{\theta}_{2i} \in \mathbb{R}^+$ are constant feedforward estimates of $\theta_{1i}^*$ and $\theta_{2i}^*$, respectively, and $u_{di}(t) \in \mathbb{R} \; \forall i=1, \ldots, m$ are subsequently defined auxiliary control signals.

Remark 1. Singularity Issues Based on (7), the control signal $v_i(t)$ will encounter singularities when $u_{di}(t) = \hat{\theta}_{2i}$. To ensure that the control law in (7) is singularity-free, the control signals $u_{di}(t)$ for $i=1, 2, \ldots, m$ are designed using the following algorithm:

$$u_{di}(t) = \begin{cases} \hat{\theta}_{2i} - \delta & \text{if } g(\mu_0(t), \mu_1(t)) \geq \hat{\theta}_{2i} - \delta \\ g(\mu_0(t), \mu_1(t)) & \text{otherwise} \end{cases} \tag{8}$$

where $\delta \in \mathbb{R}^+$ is a small parameter, $g(.)$ is a subsequently defined function, and $\mu_0(t), \mu_1(t) \in \mathbb{R}^m$ are subsequently defined feedback control terms. Note that the parameter $\delta$ can be selected arbitrarily small such that the subsequent stability analysis remains valid for an arbitrarily large range of positive control voltage signals $v_i(t)$.

In addition, the control terms $u_i(t)$ in (2) will encounter singularities when $v_i(t)=0$, which occurs when $\hat{\theta}_{1i}=0$ for any i. Since $\hat{\theta}_{1i}$ is a constant, user-defined feedforward estimate of the uncertain parameter $\theta_{1i}^*$, the singularity at $v_i(t)=0$ can be easily avoided by selecting $\hat{\theta}_{1i}>0$ for $i=1, 2, \ldots, m$.

Remark 2. The auxiliary control signal $u_{di}(t)$ in (7) can be designed to achieve asymptotic tracking control and disturbance rejection for the uncertain dynamic model in (1) and (2) over a wide range of feedforward estimates $\hat{\theta}_{ji} \neq \theta_{ji}^*$, $j=1, 2$.

The control objective is to force the system state $x(t)$ to track the state of a model reference system. Based on (1), reference model is selected as:

$$\dot{x}_m = A_m x_m + B_m \delta \tag{9}$$

where $x_m(t) \in \mathbb{R}^n$ denotes the reference state, $A_m \in \mathbb{R}^{n \times n}$ is a Hurwitz state matrix, $B_m \in \mathbb{R}^n$ denotes the reference input matrix, and $\delta(t) \in \mathbb{R}$ is the reference input signal. The reference model in (9) is designed to exhibit desirable performance characteristics.

Assumption 2: The model reference state $x_m(t)$ is bounded and sufficiently smooth in the sense that $x_m(t), \dot{x}_m(t), \ddot{x}_m(t), \dddot{x}_m(t) \in \mathcal{L}_\infty \; \forall t \geq 0$.

To quantify the control objective, the $e(t) \in \mathbb{R}^n$ is defined as $$e = x - x_m \tag{10}$$

To facilitate the subsequent analysis, a filtered tracking error $r(t)$ is also defined as $$r = \dot{e} + \alpha e \tag{11}$$

After taking the time derivative of (11) and using (1) and (10), the open loop tracking error dynamics are obtained as $$\dot{r} = A\dot{e} + A\dot{x}_m + \sum_{i=1}^m b_i \left(\frac{\Theta_{1i}^*}{\Theta_{2i}^*} u_{di}(t)\right) + \dot{f}(x, t) - \ddot{x}_m + \alpha \dot{e} \tag{12}$$

Remark 3: Although the instant portion of the control input term vanishes upon taking the time derivative of the dynamics as in (12), the plant model used in the subsequent numerical simulation retains the complete actuator dynamics. In the simulation, the control input $u_i(t)$ is generated using (2) and (7); thus, the simulation model includes the complete actuator dynamics.

The expression in (12) can be rewritten as $$\dot{r} = \tilde{N} + N_d + \Omega \dot{\mu}_d(t) - Se \tag{13}$$

where $\Omega \in \mathbb{R}^{n \times m}$ denotes a constant uncertain matrix, $S \in \mathbb{R}^{n \times n}$ is a subsequently defined uncertain matrix and the control vector $$u_d(t) \triangleq [u_{d1}(t), u_{d2}(t) \ldots u_{dm}(t)]^T \in \mathbb{R}^m.$$

In (13), the unknown, immeasurable auxiliary functions $\tilde{N}(t)$ and $N_d(t)$ are defined as $$\tilde{N} \triangleq A\dot{e} + \alpha\dot{e} + Se + \left(\dot{f}(x, t) - \dot{f}(x_m, t)\right) \tag{14}$$

$$N_d \triangleq A\dot{x}_m - \ddot{x}_m + \dot{f}(x_m, t) \tag{15}$$

The selective grouping of terms in (14) and (15) is motivated by the fact that Assumptions 1 and 2 can be utilized to develop the following inequalities:

$$\|\tilde{N}\| \leq \rho_0 \|z\|, \|N_d\| \leq \zeta_{N_d}, \|\dot{N}_d\| \leq \zeta_{\dot{N}_d} \tag{16}$$

where $\rho_0, \zeta_{N_d}, \zeta_{\dot{N}_d} \in \mathbb{R}^+$ are known bounding constants and $z(t) \in \mathbb{R}^{2n}$ is defined as $$z \triangleq [e^T \; r^T]^T \tag{17}$$

Based on the open-loop error system in (13), the auxiliary control $u_d(t)$ is designed as $$u_d(t) = \hat{\Omega}^\# (\mu_0 - \mu_1) \tag{18}$$

where $\hat{\Omega} \in \mathbb{R}^{n \times m}$ is a constant, best-guess estimate of the uncertain matrix $\Omega$, and $[.]^\#$ denotes the pseudoinverse of a matrix. In (18), $\mu_0(t), \mu_1(t) \in \mathbb{R}^n$ are subsequently defined feedback control terms. After substituting the time derivative of (18) into (13), the error dynamics can be expressed as $$\dot{r} = \tilde{N} + N_d + \tilde{\Omega}(\dot{\mu}_0 - \dot{\mu}_1) - Se \tag{19}$$

where the constant uncertain matrix $\tilde{\Omega} \in \mathbb{R}^{n \times n}$ is defined as $$\tilde{\Omega} = \Omega \hat{\Omega}^{\#}. \tag{20}$$

Assumption 3: Bounds, on the uncertain matrix $\Omega$ are known such that the feedforward estimate $\hat{\Omega}$ can be selected, such that the product $\tilde{\Omega}$ can be decomposed as $$\tilde{\Omega} = ST \tag{21}$$

where $S \in \mathbb{R}^{n \times n}$ is a positive definite symmetric matrix; and $T \in \mathbb{R}^{n \times n}$ is a unity upper triangular matrix, which is diagonally dominant in the sense that $$\epsilon \leq [T_{ii}] - \Sigma_{k=i+1}^{n} [T_{ik}] \leq Q, i=1, \ldots, n-1. \tag{22}$$

In inequalities (22), $\epsilon \in (0,1)$ and $Q \in \mathbb{R}^+$ are known bounding constants, and $T_{ik} \in \mathbb{R}$ denotes the $(i, k)^{th}$ element of the matrix T.

Remark 4: Assumption 3 is mild in the sense that (22) is satisfied over a wide range of $\hat{\Omega} \neq \Omega$. Specifically, the auxiliary control signal $u_{di}(t)$ in (7) and (18) can be designed to achieve asymptotic tracking control and disturbance rejection for the uncertain dynamic model in (1) and (2) when the mean values of the constant feedforward estimates $\hat{\Theta}_{j1}$ and $\hat{\Theta}_{j2} \forall j=1, \ldots, 6$ differ from the mean values of the actual parameters $\theta_{j1}^*$, and $\theta_{j2}^*$, $\forall j=1, \ldots, 6$ as mean $\hat{\Theta}_{j1} = 14.05$, mean $\theta_{j1}^*$, $= 25.28$
mean $\hat{\Theta}_{j2} = 7.25$, mean $\theta_{j2}^* = 12.08$ The values for $\hat{\Theta}_{j1}$ and $\hat{\Theta}_{j2} \forall j=1, \ldots, 6$ used in the simulation can be found in Table 1. This result demonstrates the capability of, the robust control design to compensate for significant dynamic uncertainty using, only a simple feedback controller structure.

TABLE 1

| Array i | 1 | 2 | 3 | 4 | 5 | 6 |
|---|---|---|---|---|---|---|
| $\Theta_{1i}^*$ [volt-deg] | 32.9 | 29.8 | 26.7 | 24.0 | 20.5 | 17.8 |
| $\Theta_{2i}^*$ [deg] | 14.7 | 13.8 | 12.8 | 11.7 | 10.0 | 9.5 |
| $\hat{\Theta}_{1i}^*$ [volt-deg] | 16.5 | 15.9 | 14.5 | 13.4 | 12.1 | 11.9 |
| $\hat{\Theta}_{2i}^*$ [deg] | 9.1 | 8.3 | 7.2 | 6.8 | 6.5 | 5.6 |

After utilizing the decomposition in (21), the error dynamics in (19) can be expressed as $$S^{-1}\dot{r} = \tilde{N}_1 + N_{d1} + \bar{T}(\dot{\mu}_0 - \dot{\mu}_1) - e \tag{23}$$

where $$\tilde{N}_1 \triangleq S^{-1}\tilde{N}, N_{d1} \triangleq S^{-1}N_d. \tag{24}$$

Since S is positive definite, $\tilde{N}_1(t)$ and $N_{d1}(t)$ satisfy the inequalities $$\|\tilde{N}_1\| \leq \rho_1 \|z\|, \|N_{d1}\| \leq \zeta_{N_{d1}}, \|\dot{N}_{d1}\| \leq \zeta_{\dot{N}_{d1}} \tag{25}$$

where $\rho_1, \zeta_{N_{d1}}, \zeta_{\dot{N}_{d1}} \in \mathbb{R}^+$ are known bounding constants. By utilizing the fact that the uncertain matrix T is unity upper triangular, the error dynamics in (23) can be rewritten:

$$S^{-1}\dot{r} = \tilde{N}_1 + N_{d1} + \dot{\mu}_0 + \bar{T}\dot{\mu}_0 - \bar{T}\dot{\mu}_1 - e \tag{26}$$

where $$\bar{T} \triangleq T - I_{n \times n}$$

is a strictly upper triangular matrix, and $I_{n \times n}$ denotes an $n \times n$ identity matrix. Based on the open-loop error system in (26), the auxiliary control terms $\mu_0(t)$ and $\mu_1(t)$ are designed as $$\mu_0 = -(k_s + I_{n \times n})e(t) - (k_s + I_{n \times n})e(0) - \int_0^t \alpha(k_s + I_{n \times n})e(r)dr \tag{27}$$

$$\mu_1 = \int_0^t \beta \text{sgn}(e(r))dr \tag{28}$$

where $\beta \in \mathbb{R}$ is a constant, positive control gain, $k_s \in \mathbb{R}^{n \times n}$ is a constant, positive definite, diagonal control gain matrix, and $\alpha$ is introduced in (11). After substituting the time derivative of (27) into (26), the closed-loop error system is obtained as $$S^{-1}\dot{r} = \tilde{N}_1 + \bar{T}\dot{\mu}_0 + N_{d1} - (k_s + I_{n \times n})r - \bar{T}\dot{\mu}_1 - e. \tag{29}$$

After taking the time derivative of (27), the term $\bar{T}\dot{\mu}_0$ can be expressed as $$\bar{T}\dot{\mu}_0 = \begin{bmatrix} \sum_{j=2}^{n} \bar{T}_{1j}\dot{\mu}_{0j} \\ \sum_{j=3}^{n} \bar{T}_{2j}\dot{\mu}_{0j} \\ \vdots \\ \bar{T}_{(n-1)n}\dot{\mu}_{0n} \\ 0 \end{bmatrix} = \begin{bmatrix} A_p \\ 0 \end{bmatrix} \tag{30}$$

where the auxiliary signal $$A_p \triangleq [A_{p1} A_{p2} \ldots A_{p(n-1)}]^T \in \mathbb{R}^{n-1},$$

with the individual elements defined as $$A_{pi} \triangleq -\sum_{j=i+1}^{n} \bar{T}_{ij}(k_{sj} + 1)r_j \tag{31}$$

$\forall i1, \ldots, n-1$ where the subscript j indicates the jth element of the vector. Based on the definitions in (27) and (30), $A_p$ satisfies, the inequality $$\|A_p\| \leq \rho_{A1} \|z\| \tag{32}$$

Remark 5: Note that based on (30) and (31), the bounding constant $\rho_{A1}$ depends only on elements i+1 to n of the control gain matrix $k_s$ due to the strictly upper triangular nature of $\bar{T}$. Thus, the element $\dot{\mu}_{01}(t)$ of the control vector $\dot{\mu}_{01}(t)$ does not appear in the term $A_p$. This fact will be utilized in the subsequent stability proof.

By utilizing (30), the error dynamics in (29) can be expressed as $$S^{-1}\dot{r} = \tilde{N}_2 + N_{d1} - (k_s + I_{n \times n})r - \bar{T}\dot{\mu}_1 - e \tag{33}$$

where $$\bar{N}_2 = \tilde{N}_1 = \begin{bmatrix} A_p \\ 0 \end{bmatrix} \tag{34}$$

Based on (25), (32), and (34), $\bar{N}_2(t)$ satisfies the inequality $$\|\bar{N}_2\| \leq \rho_2 \|z\| \tag{35}$$

where $\rho_2 \in \mathbb{R}$ is a known bounding constant.

To facilitate the subsequent stability analysis, the control gain $\beta$ introduced in (28) is selected to satisfy $$\beta > \frac{1}{\varepsilon}\left(\zeta_{N_{d1}} + \frac{1}{\alpha}\zeta_{\dot{N}_{d1}}\right) \quad (36)$$

where $\zeta_{N_{d1}}$ and $\zeta_{\dot{N}_{d1}}$ are introduced in (25), and $\varepsilon$ is introduced in (22).

To facilitate the subsequent stability analysis, let $D \subset \mathbb{R}^{2n+1}$ be a domain containing $w(t)=0$, where $w(t) \in \mathbb{R}^{2n+1}$ is defined as $$\omega(t) \triangleq \left[z^T(t)\sqrt{P(t)}\right]^T. \quad (37)$$

In (37), the auxiliary function $P(t) \in \mathbb{R}$ is defined as the generalized solution to the differential equation $$\dot{P}(t) = -L(t),\ P(0) = \beta Q|e(0)| - e^T(0)N_{d1}^T(0) \quad (38)$$

where the auxiliary function $L(t) \in \mathbb{R}$ is defined as $$L(t) = r^T(N_{d1}(t) - T\dot{\mu}_1). \quad (39)$$

Lemma 1: Provided the sufficient gain condition in (36) is satisfied, the following inequality can be obtained:

$$\int_0^t L(\tau)d\tau \leq \beta Q|e(0)| - e^T(o)N_{d1}(0) \quad (40)$$

Hence, (40) can be used to conclude that $P(t) \geq 0$.

Theorem 1: The robust control law given by (7), (18), (27), and (28) ensures asymptotic trajectory tracking in the sense that $$\|e(t)\| \to 0,\ \text{as}\ t \to \infty \quad (41)$$

provided the control gain matrix $k_s$, introduced in (27) is selected sufficiently large (see the subsequent proof), and $\beta$ is selected to satisfy the sufficient condition in (36).

Proof: Let $V(w,t): Dx[0,\infty) \to \mathbb{R}$ be a continuously differentiable, radially unbounded, positive definite function defined as $$V = \frac{1}{2}e^T e + \frac{1}{2}r^T S^{-1} r + P. \quad (42)$$

After taking the time derivative of (42) utilizing (11), (33) (33), and (39), $\dot{V}(t)$ can be expressed as:

$$\dot{V} \leq -\left(\lambda_0 - \frac{\rho_2^2}{4\lambda_{min}(k_s)}\right)\|z\|^2 \quad (43)$$

where $$\lambda_0 \triangleq \min\{\alpha, 1\},$$

and $\lambda_{min}(.)$ denotes the minimum eigenvalue of the argument.

Inequality, (44) can be used to show that $V(w,t) \in L_\infty$; h hence, $e(t), r(t), P(t) \in L_\infty$. Given that $e(t), r(t) \in L_\infty$, (8) can be utilized to show that $\dot{e}(t) \in L_\infty$. Since $e(t) \in L_\infty$, (7) can be used along with the assumption that $x_m(t) \in L_\infty$ to prove that $x(t), \dot{x}(t) \in L_\infty$. Based on the fact that $x(t) \in L_\infty$, Assumption 1 can be utilized to show that $f(x,t) \in L_\infty$. Given that $x(t), \dot{x}(t), f(x,t) \in L_\infty$, (1) can be used to show that $u(t) \in L_\infty$. Since $e(t), r(t) \in L_\infty$, the time derivative of (27) and (28) can be used to show that $\dot{\mu}_0(t), \dot{\mu}_1(t) \in L_\infty$. Given that $e(t), r(t)\dot{\mu}_1(t) \in L_\infty$, (33) can be used along with (35) to show that $r(t) \in L_\infty$. Since $e(t), r(t) \in L_\infty$, (17) can be used to show that $z(t)$ is uniformly continuous. Since $z(t)$ is uniformly continuous, $V(w,t)$ is radially unbounded, and (42) and (43) can be used to show that $z(t) \in L_\infty \cap L_2$. Barbalat's Lemma can now be invoked to state that $$\|z(t)\| \to 0,\ \text{as}\ t \to \infty\ \forall w(0) \in \mathbb{R}^{2n+1} \quad (44)$$

Based on the definition of $z(t)$, (44) can be used to show that $$\|e(t)\| \to 0,\ \text{as}\ t \to \infty\ \forall w(0) \in \mathbb{R}^{2n+1}.$$

A numerical simulation was created to verify the performance of the control law developed in (2), (7), (18), (27), and (28). The simulation is based on the dynamic model given in (1) and (2), where n=3 and m=6. Specifically, the control input $\mu_i(t)$, i=1, 2, . . . , 6 synthetic jet arrays, and the 3-DOF state vector is defined in terms, of the roll, pitch, and yaw rates as $$x = [x_1 x_2 x_3]^T$$

The state and input matrices A and B and reference system matrices $A_m$ and $B_m$ are defined based on the Barron Associates nonlinear tailless aircraft model (BANTAM).

The 3-DOF linearized model for the BANTAM was obtained analytically at the trim condition: Mach number M.=0.455; angle of attack $\alpha$=2.7 deg, and side slip angle $\beta$=0. The linearized dynamic model does not produce the same result as the full nonlinear system with mechanical control surfaces, but the angular, accelerations caused by the virtual surface deflections are predicted accurately using the matrix $\beta$. The actual (i.e, $\Theta_{1i}^*$ and $\Theta_{2i}^*$, i=1, 2, . . . , 6) and estimated (i.e. $\hat{\theta}_{1i}$ and $\hat{\theta}_{2i}$, i=1, 2, . . . , 6) values of the SJA parameters (see (2) and (7)) are shown in Table 1 above.

The external disturbance used in the simulation is given by $$d = \begin{bmatrix} 0.2\sin(0.5t) \\ 0.1\sin(0.5t) + 0.2\sin(0.5t) \\ 0.15\sin(0.3t) \end{bmatrix}$$

The reference input $\delta(t)$ used in the simulation is given by $$\delta(t) = \begin{cases} 0.5\sin(t), & 0 \leq t \leq 50 \\ 0.5\sin(t) + \sin(2t) & 50 < t \leq 100 \end{cases} \quad (45)$$

Figure 6:
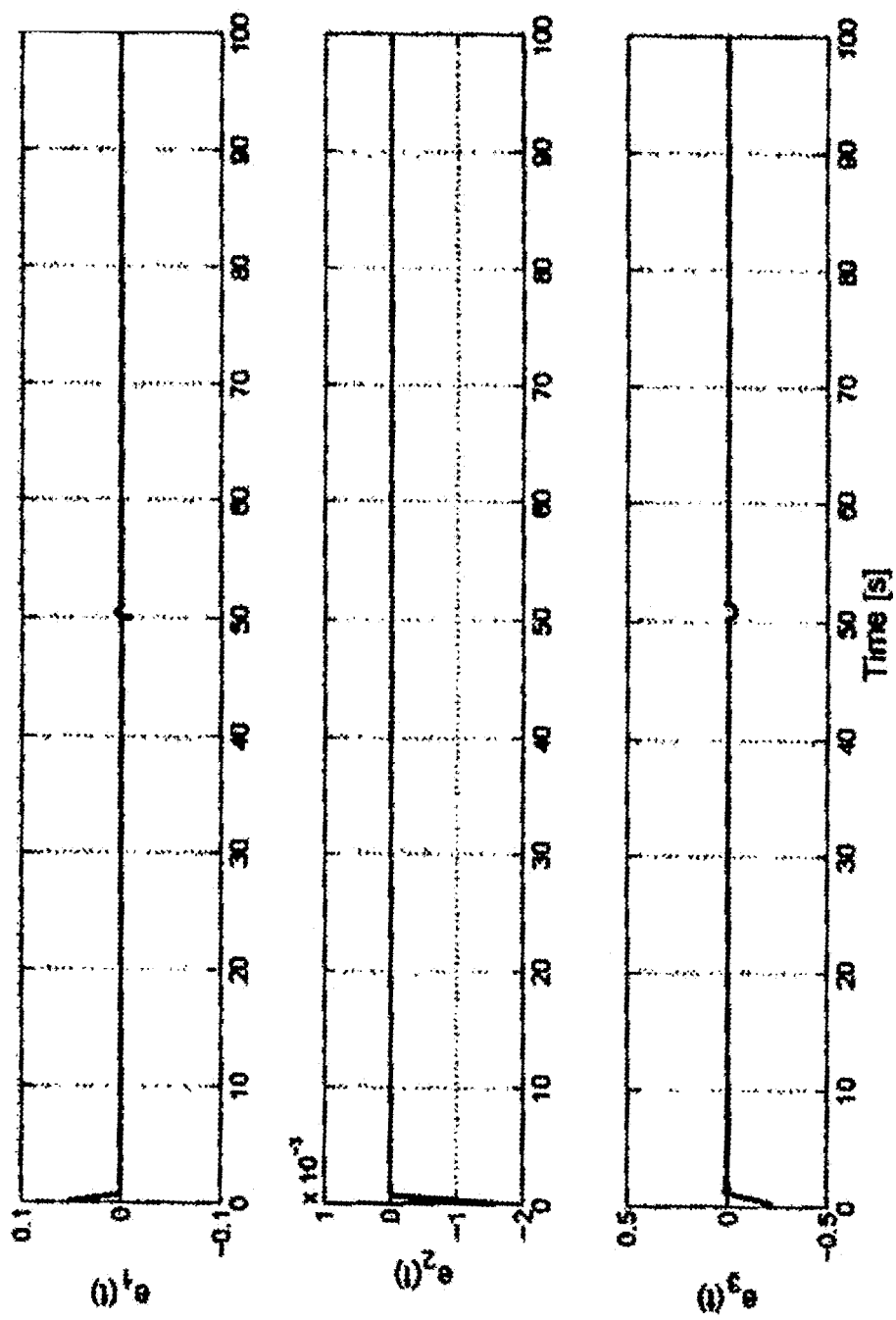
FIG. 6 shows plots of tracking error achieved during closed-loop controller operation according to one simulation.
Figure 7:
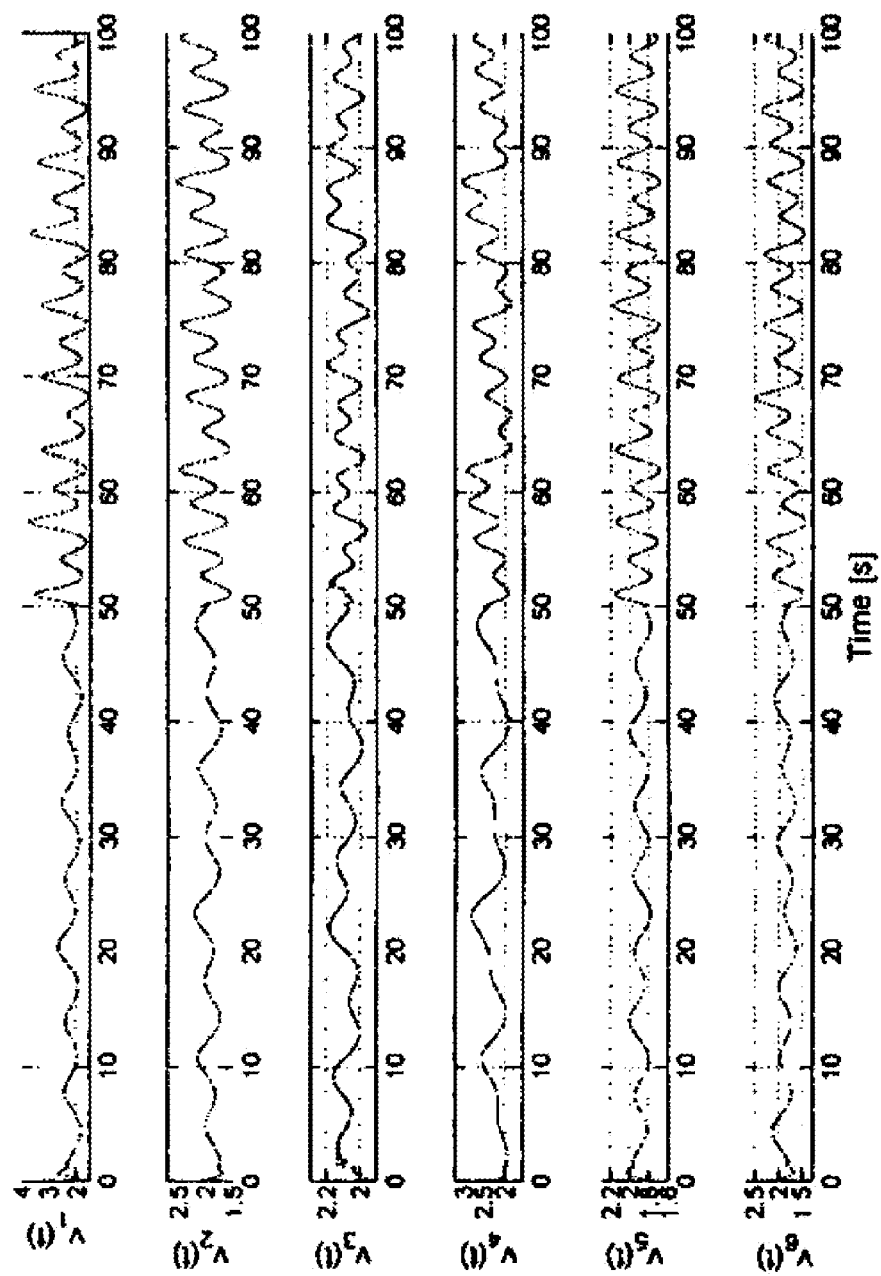
FIG. 7 shows plots of control signals $v_i$ (t), i=1, . . . 6 used during closed-loop controller operation according to the simulation of FIG. 6.
Figure 8:
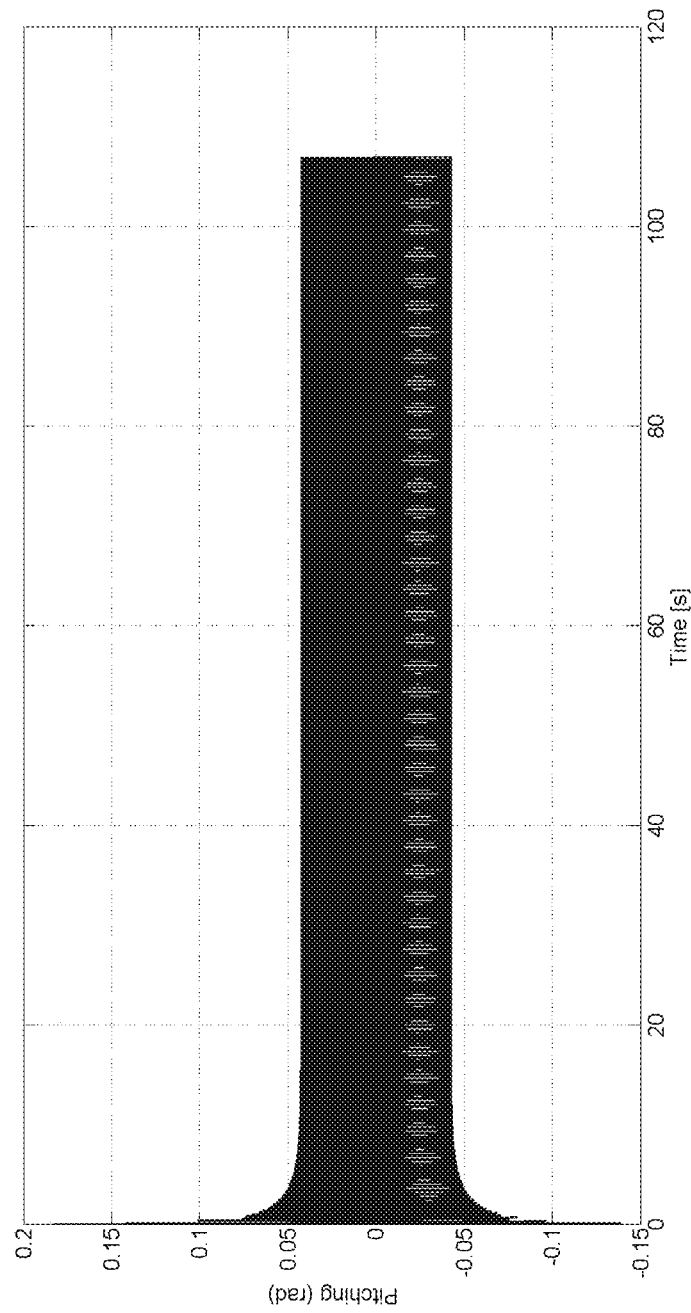
FIG. 8 plots uncontrolled pitching response for a free stream velocity U=18.25 m/s according to one example.
Figure 9:
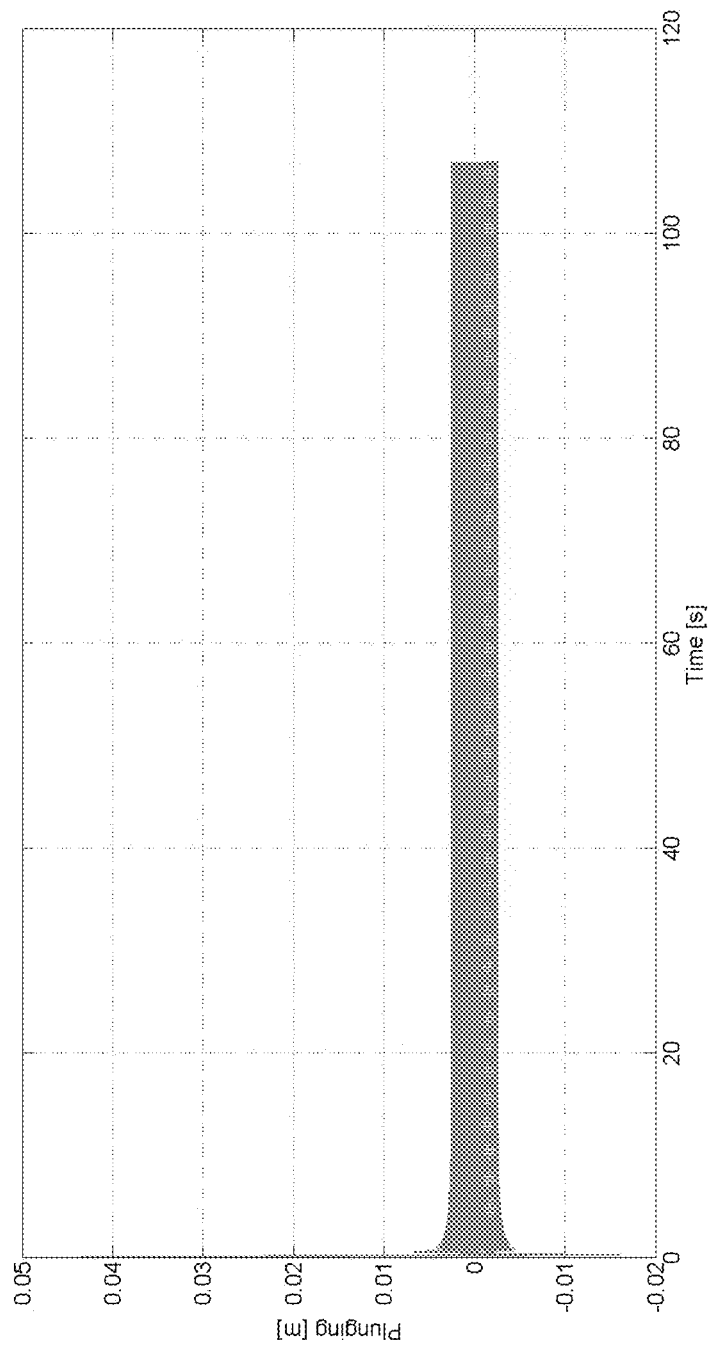
FIG. 9 plots uncontrolled plunging response for a free stream velocity U=18.25 m/s according to one example.
Figure 10:
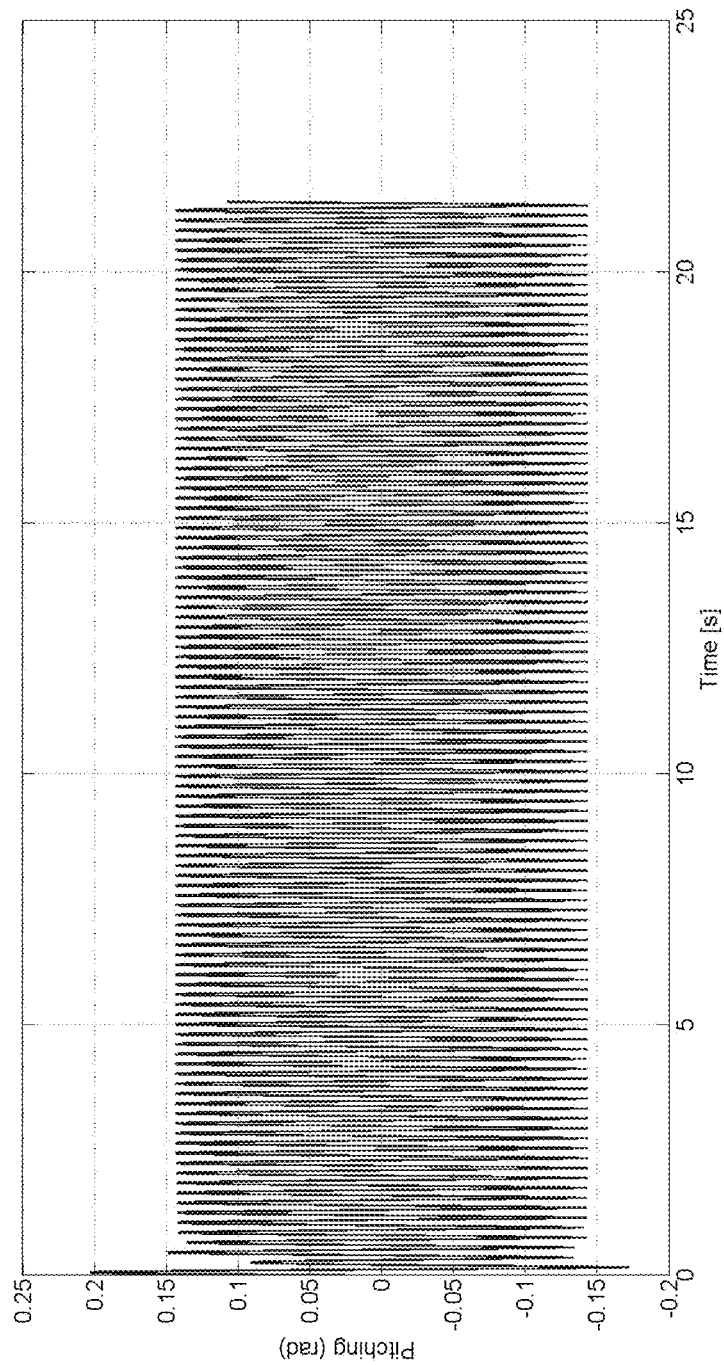
FIG. 10 plots uncontrolled pitching response for a free stream velocity U=19.5 m/s.
Figure 11:
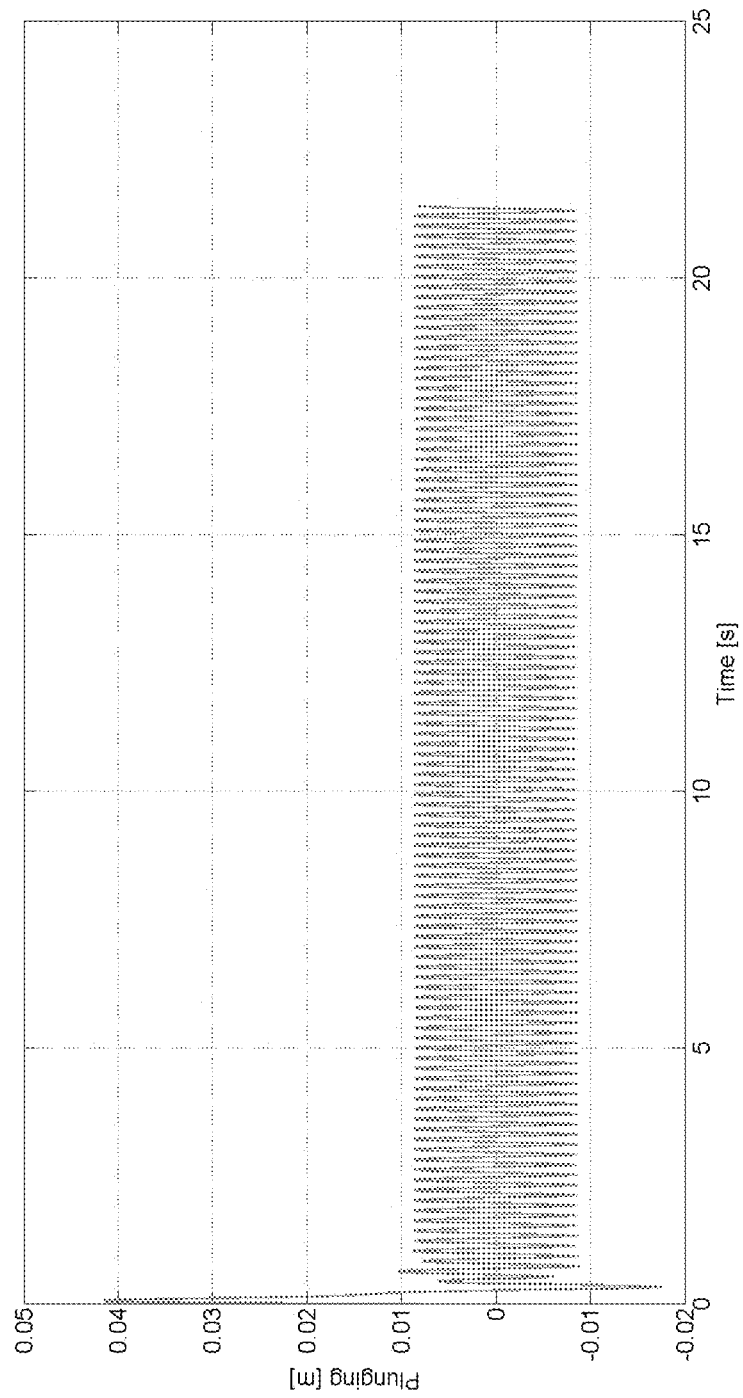
FIG. 11 plots uncontrolled plunging response for a free stream velocity U=19.5 m/s.

FIGS. 6 and 7 illustrate the performance of the proposed troller with control gains selected as $\alpha$=0.3, $\beta$=diag $\{3.3, 0.3, 0.8\}$ $k_s$=diag $\{0.10, 0.15, 2.3\}$ FIG. 6 shows the tracking error response, which demonstrate the rapid convergence of the closed-loop system, and FIG. 7 shows the control commands during the closed-loop operation. The effects of the instantaneous change in the reference input $\delta(t)$ (i e., see (45)) at t=50s are apparent in the $e_1(t)$ and $e_3(t)$ plots in FIGS. 6 and 7, but the tracking errors converge to zero quickly in spite of this sudden switch in the reference command. The control command can be maintained within reasonable limits, and the level of chattering is minimal.

Example 2: Management of Limit Cycle Oscillations (LCO)

The equation describing LCO in an airfoil approximated as a 2-dimensional thin plate can be expressed as $$M_s\ddot{p} + C_s\dot{p} + F(p)p = \begin{bmatrix} -\text{Lift} \\ \text{Moment} \end{bmatrix} \quad (1a)$$

where the coefficients $M_s$, $C_s \in \mathbb{R}^{2\times 2}$ denote the structural mass and damping matrices, $F(p) \in \mathbb{R}^{2\times 2}$ is a nonlinear stiffness matrix, and $p(t) \in \mathbb{R}^2$ denotes the state vector. In Equation (1a), $p(t)$ is explicitly defined as $$p = \begin{bmatrix} h \\ a \end{bmatrix} \quad (2a)$$

where $h(t)$, $\alpha(t) \in \mathbb{R}$ denote the plunging [meters] and pitching [radians] displacements describing the LCO effects. Also in Equation (1a), the structural linear mass matrix $M_s$ $$M_s = \begin{bmatrix} m & S_\alpha \\ S_\alpha & I_\alpha \end{bmatrix} \quad (3a)$$

where the parameters $S_\alpha$, $I_\alpha \in \mathbb{R}$ are the static moment and moment of inertia, respectively. The structural linear damping matrix is described as $$C_s = 2 \begin{bmatrix} \varsigma_h \sqrt{k_h m} & 0 \\ 0 & \varsigma_\alpha \sqrt{k_\alpha I_\alpha} \end{bmatrix} \quad (4a)$$

where the parameters $\varsigma_h$, $\varsigma_\alpha \in \mathbb{R}$ are the damping logarithmic decrements for plunging and pitching, and $m \in \mathbb{R}$ is the mass of the wing, or in this case, a flat plate. The nonlinear stiffness matrix utilized is $$F(p) = \begin{bmatrix} k_h & 0 \\ 0 & k_\alpha + k_{\alpha^3} \alpha^2 \end{bmatrix} \quad (5a)$$

where $k_\alpha$, $k_{\alpha^3} \in \mathbb{R}$ denote structural resistances to pitching (linear and nonlinear) and $k_h \in \mathbb{R}$ structural resistance to plunging.

In Equation (1a), the total lift and moment are explicitly defined as $$\begin{bmatrix} -\text{Lift} \\ \text{Moment} \end{bmatrix} = \begin{bmatrix} -(L + L_{v_j}) \\ (M + M_{v_j}) \end{bmatrix} \quad (6a)$$

$$= M_a \ddot{p} + C_a \dot{p} + K_a p + L_\eta \eta + Bu$$

where $L_{v_j}(t)$, $M_{v_j}(t) \in \mathbb{R}$ denote the equivalent control force and moment generated by the jth SJA, and $L(t)$, $M(t) \in \mathbb{R}$ are the aerodynamic lift and moment due to the 2-degree-of-freedom motion. In Equation (6a), $\eta(t) \in \mathbb{R}^2$ denotes the aerodynamic state vector that relates the moment and lift to the structural modes. Also in Equation (6a), $u(t) \in \mathbb{R}^2$ denotes the SJA-based control input (e.g., the SJA air velocity or acceleration), and $B \in \mathbb{R}^{2\times 2}$ is an uncertain constant input gain matrix that relates the control input $u(t)$ to the equivalent force and moment generated by the SJA. Also in Equation (6a), the aerodynamic and mode matrices $M_a$, $C_a$, $K_a$, $L_\eta \in \mathbb{R}^{2\times 2}$ are described as $$M_a = \pi p b^2 \begin{bmatrix} -1 & ba \\ ba & -b^2\left(\frac{1}{8} + a^2\right) \end{bmatrix} \quad (7a)$$

$$C_a = \pi p b^2 \begin{bmatrix} 0 & -U \\ 0 & -Ub\left(\frac{1}{2} - a\right) \end{bmatrix} + $$

$$2\pi p U b \phi(0) \begin{bmatrix} -1 & -b\left(\frac{1}{2} - a\right) \\ b\left(\frac{1}{2} + a\right) & b^2\left(\frac{1}{2} + a\right)\left(\frac{1}{2} - a\right) \end{bmatrix} \quad (8a)$$

$$k_a = 2\pi p U b \phi(0) \begin{bmatrix} 0 & -U \\ 0 & b\left(\frac{1}{2} + a\right)U \end{bmatrix} \quad (9a)$$

$$L_\eta = 2\pi p U b \begin{bmatrix} a_1 b_1 & a_2 b_2 \\ -b\left(\frac{1}{2} + a\right)a_1 b_1 & -b\left(\frac{1}{2} + a\right)a_2 b_2 \end{bmatrix} \quad (10a)$$

where $\phi(0)$ is the Wagner solution function at 0, and the parameters $a_1$, $b_1$, $a_2$, $b_2 \in \mathbb{R}$ are the Wagner coefficients. In addition, $a$, $b \in \mathbb{R}$ denote the relative locations of the rotational axis from the mid-chord and the semi-chord, respectively. The aerodynamic state variables are governed by $$\dot{\eta} = C_\eta \dot{p} + K_\eta p + S_\eta \eta \quad (11a)$$

The aerodynamic state matrices in Equation (11a), $C_\eta$, $K_\eta$, $S_\eta \in \mathbb{R}^{2\times 2}$, are explicitly defined as $$C_\eta = \frac{U}{b} \begin{bmatrix} -1 & -b\left(\frac{1}{2} - a\right) \\ -1 & -b\left(\frac{1}{2} - a\right) \end{bmatrix} \quad (12a)$$

$$K_\eta = \frac{U}{b} \begin{bmatrix} 0 & -U \\ 0 & -U \end{bmatrix} \quad (13a)$$

$$S_\eta = \frac{U}{b} \begin{bmatrix} -b_1 & 0 \\ 0 & -b_2 \end{bmatrix} \quad (14a)$$

By substituting Equation (6a) into Equation (1a), the LCO dynamics can be expressed as $$\ddot{p} = -M^{-1}C\dot{p} - M^{-1}Kp + M^{-1}L_\eta \eta + M^{-1}Bu \quad (15a)$$

where $C = C_s - C_a$, $K = F(p) - K_a$, and $M = M_s - M_a$. By making the definitions $x_1(t) = h(t)$, $x_2(t) = \alpha(t)$, $x_3(t) = \dot{h}(t)$, $x_4(t) = \dot{\alpha}(t)$, $x_5(t) = \eta_1(t)$, and $x_6(t) = \eta_2(t)$, the dynamic equation in Equation (15a) can be expressed in state form as $$\dot{x} = A(x)x + \bar{B}u \quad (16a)$$

where $x(t) \in \mathbb{R}^6$ is the state vector, $A(x) \in \mathbb{R}^{6\times 6}$ is the state matrix (state-dependent). In Equation (16a), the input gain matrix $\bar{B} \in \mathbb{R}^{6\times 2}$ is defined as $$\bar{B} = \begin{bmatrix} 0_{2\times 2} \\ M^{-1}B \\ 0_{2\times 2} \end{bmatrix} \quad (17a)$$

where $0_{2\times 2}$ denotes a 2×2 matrix of zeros. The structure of the input gain matrix in Equation (17a) results from the fact that the control input $u(t)$ only directly affects $\ddot{h}(t)$ and $\ddot{\alpha}(t)$.

In some embodiments, an objective is to design a control signal $u(t)$ to regulate the plunge and pitching dynamics (i.e., h(t), a(t)) resulting from LCO) to zero. To facilitate the control design, the expression in Equation (15a) is rewritten as $$M\ddot{p} = g(h,\alpha,\eta) + Bu \qquad (18a)$$

where $g(h, \alpha, \eta)$ is an unknown, unmeasurable auxiliary function.

Remark 1. Based on the open-loop error dynamics in Equation (18a), one of the control design challenges is that the control input u(t) is pre-multiplied by the uncertain matrix B. In the following control development and stability analysis, it will be assumed that the matrix B is uncertain, and the robust control law will be designed with a constant feedforward estimate of the uncertain matrix. The simulation results demonstrate the capability of the robust control law to compensate for the input matrix uncertainty without the need for online parameter estimation or function approximators.

To quantify the control objective, a regulation error $e_1(t) \in \mathbb{R}^2$ and auxiliary tracking error variables $e_2(t), r(t) \in \mathbb{R}^2$ are defined as $$e_1 = p - p_d \qquad (19a)$$

$$e_2 = \dot{e}_1 + \alpha_1 e_1 \qquad (20a)$$

$$r = \dot{e}_2 + \alpha_2 e_2 \qquad (21a)$$

where $\alpha_1, \alpha_2 > 0 \in \mathbb{R}$ are user-defined control gains, and the desired plunging and pitching states $p_d = [h,a]^T = [0,0]^T$ for the plunging and pitching suppression objective. To facilitate the following analysis, Equation (21a) is pre-multiplied by M and the time derivative is calculated as $$M\dot{r} = M\ddot{e}_2 + \alpha_2 M\dot{e}_2 \qquad (22a)$$

After using Equations (18a)-(21a), the open-loop error dynamics are obtained as $$M\dot{r} = \tilde{N} + N_d + B\dot{u} - e_2 \qquad (23a)$$

where the unknown, unmeasurable auxiliary functions $\tilde{N}(e_1, e_2, r)$, $N_d(p_d, \ddot{p}_d) \in \mathbb{R}^2$ are defined as $$\tilde{N} \triangleq \dot{g}(p,\eta) - \dot{g}(p_d,\eta) + \qquad (24a)$$
$$\alpha_1(r - \alpha_2 e_2 - \alpha_1 e_2 + \alpha_1^2 e_1) + \alpha_2 M(r - \alpha_2 e_2) + e_2$$

$$N_d \triangleq -\dddot{p}_d + \dot{g}(p_d, \eta) \qquad (25a)$$

The motivation for defining the auxiliary functions in Equations (24a) and (25a)a is based on the fact that the following inequalities can be developed:

$$\|\tilde{N}\| \le \rho_0\|z\|, \|N_d\| \le \varsigma_{N_d}, \|\dot{N}_d\| \le \varsigma_{\dot{N}_d} \qquad (26a)$$

where $\rho_0, \varsigma_{N_d}, \varsigma_{\dot{N}_d} \in \mathbb{R}^+$ are known bounding constants, and $z(t) \in \mathbb{R}^6$ is defined as $$z \triangleq [\, e_1^T \;\; e_2^T \;\; r^T \,]^T \qquad (27a)$$

Based on the open-loop error dynamics in Equation (23a), the control input is designed via $$\dot{u} = \hat{B}^{-1}(-(k_s + I_{2\times 2})r - \beta sgn(e_2(t))) \qquad (28a)$$

where $k_s, \beta \in \mathbb{R}^{2\times 2}$ denote constant, positive definite, diagonal control gain matrices, and $I_{2\times 2}$ denotes a 2×2 identity matrix. In Equation (28a), $\hat{B} \in \mathbb{R}^{2\times 2}$ denotes a constant, feedforward "best guess" estimate of the uncertain input gain matrix B. The control input u(t) does not depend on the unmeasurable acceleration term r(t), since Equation (28a) can be directly integrated to show that u(t) requires measurements of $e_1(t)$ and $e_2(t)$ only which are the error of pitching and plunging respectively.

To facilitate the following stability proof, the control gain matrix β in Equation (28a) is selected to satisfy the sufficient condition $$\lambda_{min}(\beta) > \varsigma_{N_d} + \frac{1}{\alpha_2}\varsigma_{\dot{N}_d} \qquad (29a)$$

where $\lambda_{min}(.)$ denotes the minimum eigenvalue of the argument. After substituting Equation (28a) into Equation (23a), the closed-loop error dynamics are obtained as $$M\dot{r} = \tilde{N} + N_d - (k_s + I_{n\times n})r + \beta sgn(e_2(t)) - e_2 \qquad (30a)$$

To reduce the complexity of the following stability analysis, it is assumed that the product $B\hat{B}^{-1}$ is equal to identity. It can be proven that asymptotic regulation can be achieved for the case where the feedforward estimate $\hat{B}$ is within some prescribed finite range of the actual matrix B.

The following simulation results demonstrate the performance of a controller according to embodiments of the present invention that seek to control LOC in the presence of uncertainty in the input gain matrix B.

Theorem 1. The controller given in Equation (28a) ensures asymptotic regulation of pitching and plunging displacements in the sense that $$\|e_1(t)\| \to 0 \text{ as } t \to \infty \qquad (31a)$$

provided the control gain $k_s$ is selected sufficiently large, and β is selected according to the sufficient condition in Equation (29a).

Lemma 1. To facilitate the following proof let $\mathcal{D} \subset \mathbb{R}^7$ be a domain containing w(t)=0, where $w(t) \in \mathbb{R}^7$ is defined as $$w(t) \triangleq \left[ z^T \; \sqrt{P(t)} \right]^T \qquad (32a)$$

In Equation (32a), the auxiliary function $P(t) \in \mathbb{R}$ is the generalized solution to the differential equation $$\dot{P}(t) = -L(t) \qquad (33a)$$

$$P(0) = \beta\|e_2(0)\| - N_d^T(0)e_2(0) \qquad (34a)$$

where the auxiliary function $L(t) \in \mathbb{R}$ is defined as $$L(t) = r^T(N_d(t) - \beta sgn(e_2)) \qquad (35a)$$

Provided the sufficient condition in Equation (29a) is satisfied, the following inequality can be obtained:

$$\int_0^t L(r)dr \le \beta\|e_2(0)\| - N_d^T(0)e_2(0) \qquad (36a)$$

Hence, Equation (36a) can be used to conclude that $P(t) \ge 0$.

Proof 1. (See Theorem 1) Let V(w,t): $\mathcal{D} \times [0, \infty) \to \mathbb{R}^+$ defined as the nonnegative function $$V(w,t) \triangleq \frac{1}{2}e_1^T e_1 + \frac{1}{2}e_2^T e_2 + \frac{1}{2}r^T Mr + P \qquad (37a)$$

where $e_1(t)$, $e_2(t)$, and $r(t)$ are defined in Equations (19a)-(21a), respectively; and the positive definite function P(t) is defined in Equation (33a). The function V(w,t) satisfies the inequality $$U_1(w) \leq V(w,t) \leq U_2(w) \tag{38a}$$

provided the sufficient condition introduced in Equation (29a) is satisfied, where $U_1(w)$, $U_2(w) \in \mathbb{R}$ denote the positive definite functions $$U_1 \triangleq \lambda_1 \|w\|^2, \quad U_2 \triangleq \lambda_2 \|w\|^2 \tag{39a}$$

where $$\lambda_1 = \min\left\{\frac{1}{2}\lambda_{min}(M)\right\}$$

and $\lambda_2 = \max\{1, \lambda_{max}(M)\}$. After taking the time derivative of Equation (37a) and utilizing Equation (20a), Equation (21a), Equation (30a), and Equation (33a), V(w,t) can be upper bounded as $$\dot{V}(w,t) \leq \tag{40a}$$
$$-\left(\alpha_1 - \frac{1}{2}\right)\|e_1\|^2 - \left(\alpha_2 - \frac{1}{2}\right)\|e_2\|^2 - \|r\|^2 - k_s\|r\|^2 + p_0\|z\|\|r\|$$

where the bounds in Equation (26a) were used, and the fact that $$e_1^T e_2 \leq \frac{1}{2}\|e_1\|^2 + \frac{1}{2}\|e_2\|^2$$

(i.e., Young's inequality) was utilized. After completing the squares in Equation (40a), the upper bound on V(w,t) can be expressed as $$\dot{V}(w,t) \leq -\left(\alpha_1 - \frac{1}{2}\right)\|e_1\|^2 - \tag{41a}$$
$$\left(\alpha_2 - \frac{1}{2}\right)\|e_2\|^2 - \|r\|^2 - k_s\left(\|r\| - \frac{p_0}{2k_s}\|z\|\right)^2 + \frac{p_0^2}{4k_s}\|z\|^2$$

Since $k_3 > 0$, the upper bound in Equation (41a) can be expressed as $$\dot{V}(w,t) \leq -\left(\lambda_0 - \frac{p_0^2}{4k_s}\right)\|z\|^2 \tag{42a}$$

where $\lambda_0 \triangleq \min\left\{\alpha_1 - \frac{1}{2}, \alpha_2 - \frac{1}{2}, 1\right\}$.

The following expression can be obtained from Equation (42a):

$$\dot{V}(w,t) \leq -U(w) \tag{43a}$$

where $U(w) = c\|z\|^2$, for some positive constant $c \in \mathbb{R}$, is a continuous, positive semi-definite function.

It follows directly from the Lyapunov analysis that $e_1(t)$, $e_2(t)$, $r(t) \in \mathcal{L}_\infty$. This implies that $\dot{e}_1(t)$, $\dot{e}_2(t) \in \mathcal{L}_\infty$ from the definitions given in Equations (20a) and (21a). Given that $\dot{e}_1(t)$, $e_2(t)$, $r(t) \in \mathcal{L}_\infty$, it follows that $\ddot{e}_1(t) \in \mathcal{L}_\infty$ from Equation (21a). Thus, Equation (19a) can be used to prove that p(t), $\dot{p}(t)$, $\ddot{p}(t) \in \mathcal{L}_\infty$. Since p(t), $\dot{p}(t)$, $\ddot{p}(t) \in \mathcal{L}_\infty$, Equation (18a) can be used to prove that $u(t) \in \mathcal{L}_\infty$. Since r(t), $u(t) \in L_\infty$, Equation (28a) can be used to show that $\dot{u}(t) \in \mathcal{L}_\infty$. Given that $e_1(t)$, $e_2(t)$, r(t), $\dot{u}(t) \in \mathcal{L}_\infty$, Equation (30a) can be used along with Equation (26a) to prove that $\dot{r}(t) \in \mathcal{L}_\infty$. Since $\dot{e}_1(t)$, $\dot{e}_2(t)$, $\dot{r}(t) \in \mathcal{L}_\infty$, $e_1(t)$, $e_2(t)$, r(t), are uniformly continuous. Equation (27a) can then be used to show that z(t) is uniformly continuous. Given that $e_1(t)$, $e_2(t)$, $r(t) \in \mathcal{L}_\infty$, Equation (37a) and Equation (42a) can be used to prove that $z(t) \in \mathcal{L}_\infty \cap \mathcal{L}_2$. Barbalat's lemma can now be invoked to prove that $\|z(t)\| \to 0$ as $t \to \infty$. Hence, $\|e_1(t)\| \to 0$ as $t \to \infty$ from Equation (27a). Further, given that V(w,t) in Equation (37a) is radially unbounded, convergence of $e_1(t)$ is guaranteed, regardless of initial conditions—a global result.

A numerical simulation was created to demonstrate the performance of the control law developed in Equation (28a). In order to develop a realistic stepping stone to high-fidelity numerical simulation results using detailed computational fluid dynamics models, the following simulation results are based on detailed dynamic parameters and specifications. The simulation is based on the dynamic model given in Equation (1a) and Equation (11a). The dynamic parameters utilized in the simulation are summarized in Table 2:

TABLE 2

Constant simulation parameters.

| | | |
|---|---|---|
| $\rho = 1.225 \frac{kg}{m^3}$ | a = −0.24 | $U = 18.25\frac{m}{s}, 19.5\frac{m}{s}, 20.5\frac{m}{s}$ |
| m = 2.55 kg | b = 0.11 m | $v = 18\frac{m}{s}$ |
| $S_a = 10.4 \times 10^{-3}$ kg·m | $a_1 = 0.1650$ | $a_2 = 0.0455$ |
| $I_a = 2.51 \times 10^{-3}$ kg·m | $b_1 = 0.3350$ | $b_2 = 0.3000$ |
| $k_h = 450 \frac{N}{m}$ | $k_a = 9.3 \frac{N}{m}$ | $k_{a3} = 55 \frac{N}{m}$ |
| $\zeta_h = 5.5 \times 10^{-3}$ | $\zeta_a = 1.8 \times 10^{-2}$ | |

The following simulation results were achieved using control gains defined as $$\beta = \begin{bmatrix} 0.0001 & 0 \\ 0 & 25 \end{bmatrix}, k_s = \begin{bmatrix} 0.00001 & 0 \\ 0 & 0.11 \end{bmatrix} \tag{44a}$$

$$a_1 = \begin{bmatrix} 1 & 0 \\ 0 & 35 \end{bmatrix}, a_2 = \begin{bmatrix} 1 & 0 \\ 0 & 35 \end{bmatrix} \tag{45a}$$

The control gains given in Equations (44a) and (45a) were selected based on achieving a desirable response in terms of settling time and required control effort. To test the case where the input gain matrix B is uncertain, it is assumed in the simulation that the actual value of B is the 2×2 identity matrix, but the constant feedforward estimate $\hat{B}$ used in the control law is given by $$\hat{B} = \begin{bmatrix} 0.9 & 0.1 \\ -0.1 & 1.1 \end{bmatrix}$$

Figure 12:
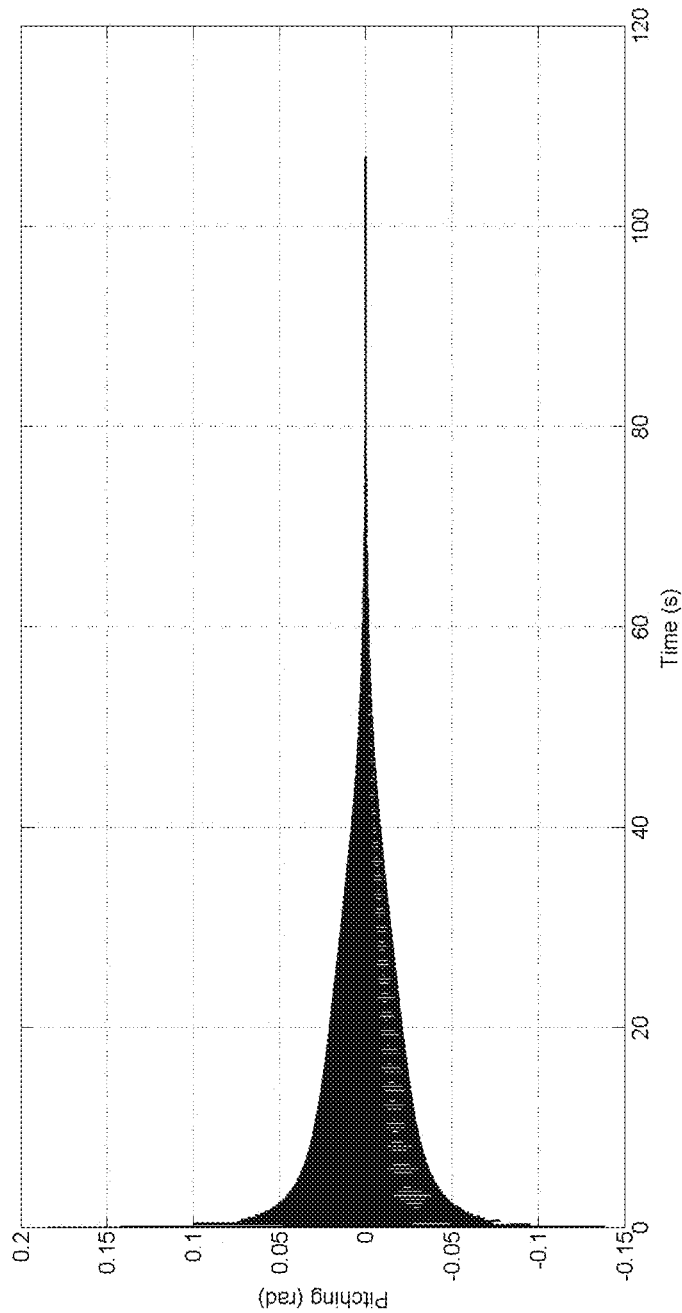
FIG. 12 plots the closed-loop pitching response for a free stream velocity U=18.25 m/s.
Figure 13:
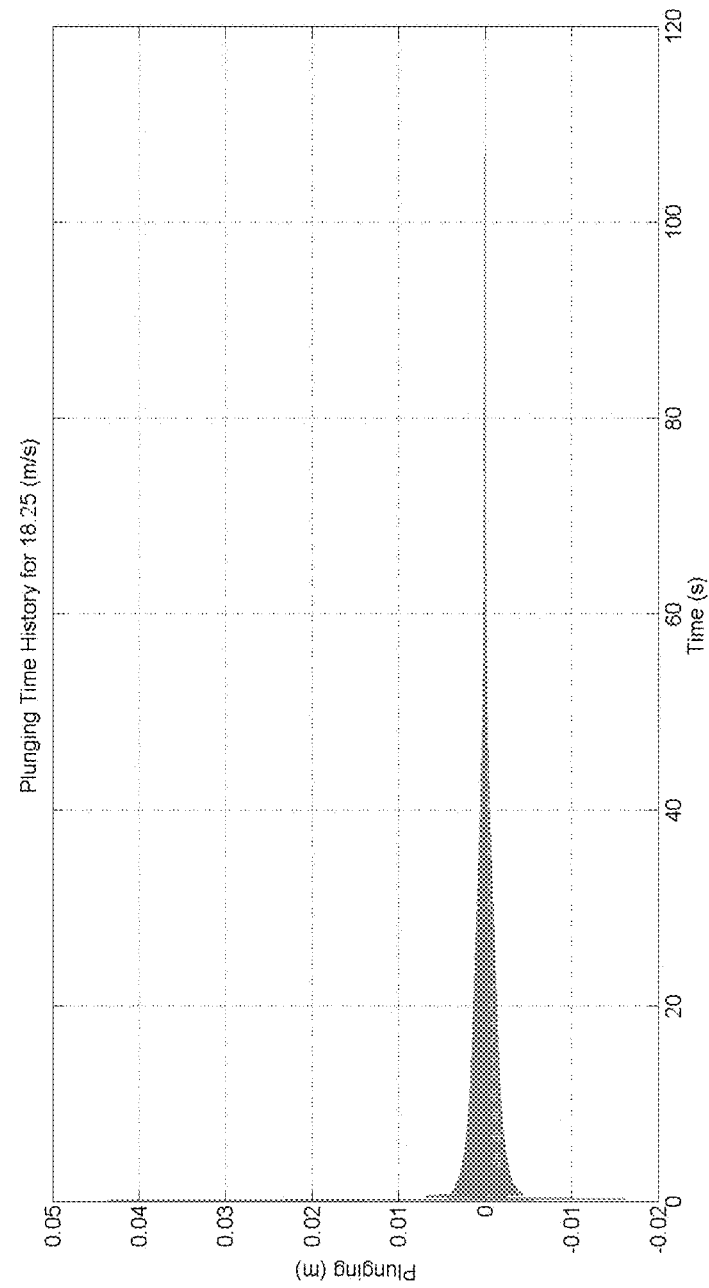
FIG. 13 plots the closed-loop plunging response for a free stream velocity U=18.25 m/s.
Figure 14:
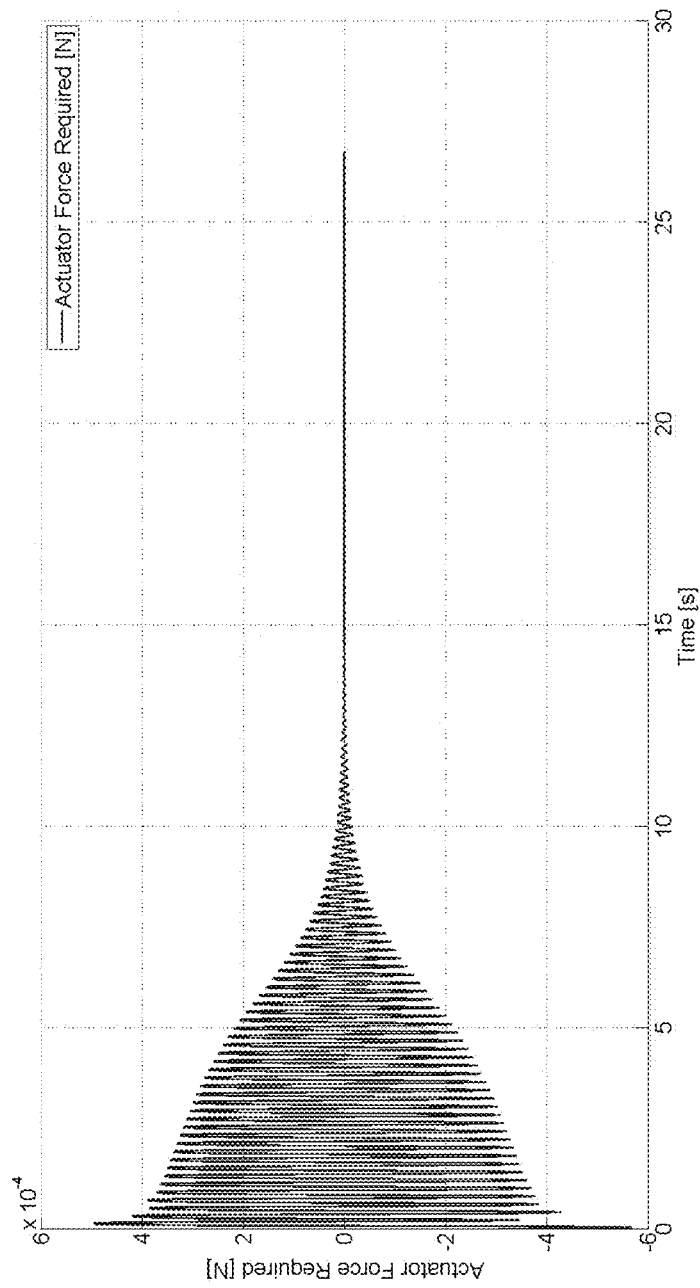
FIG. 14 plots actuator force required for free stream velocity U=18.25 m/s.
Figure 15:
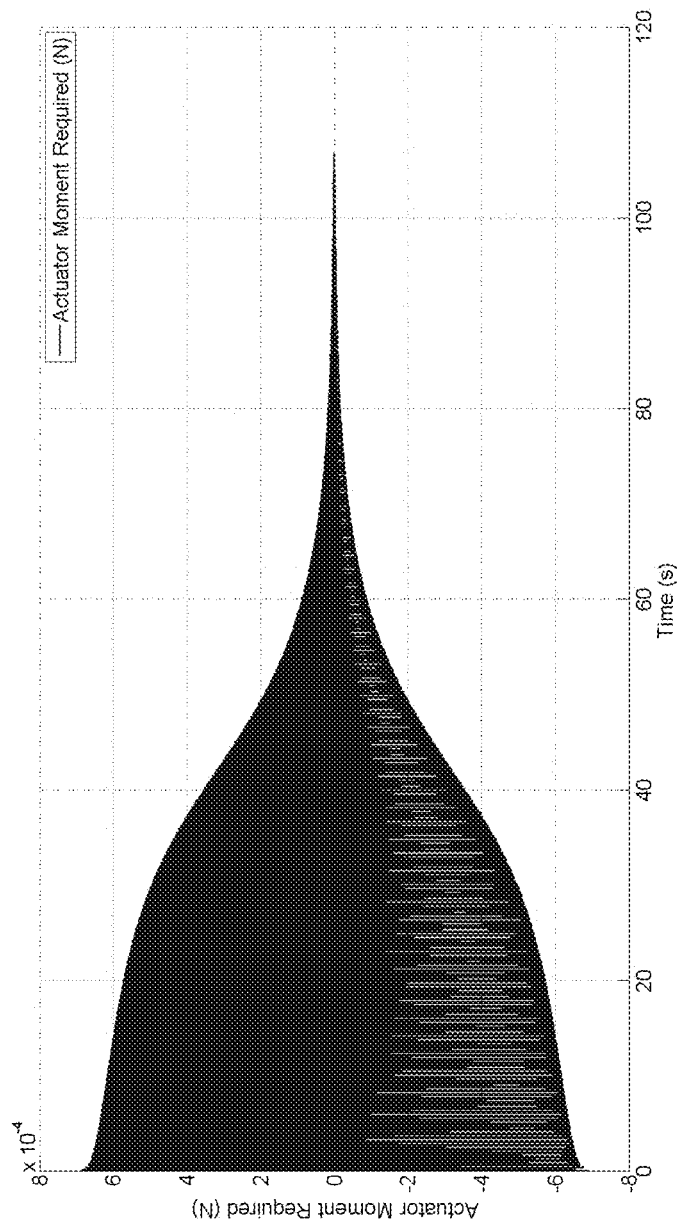
FIG. 15 plots actuator moment required for free stream velocity U=18.25 m/s.
Figure 16:
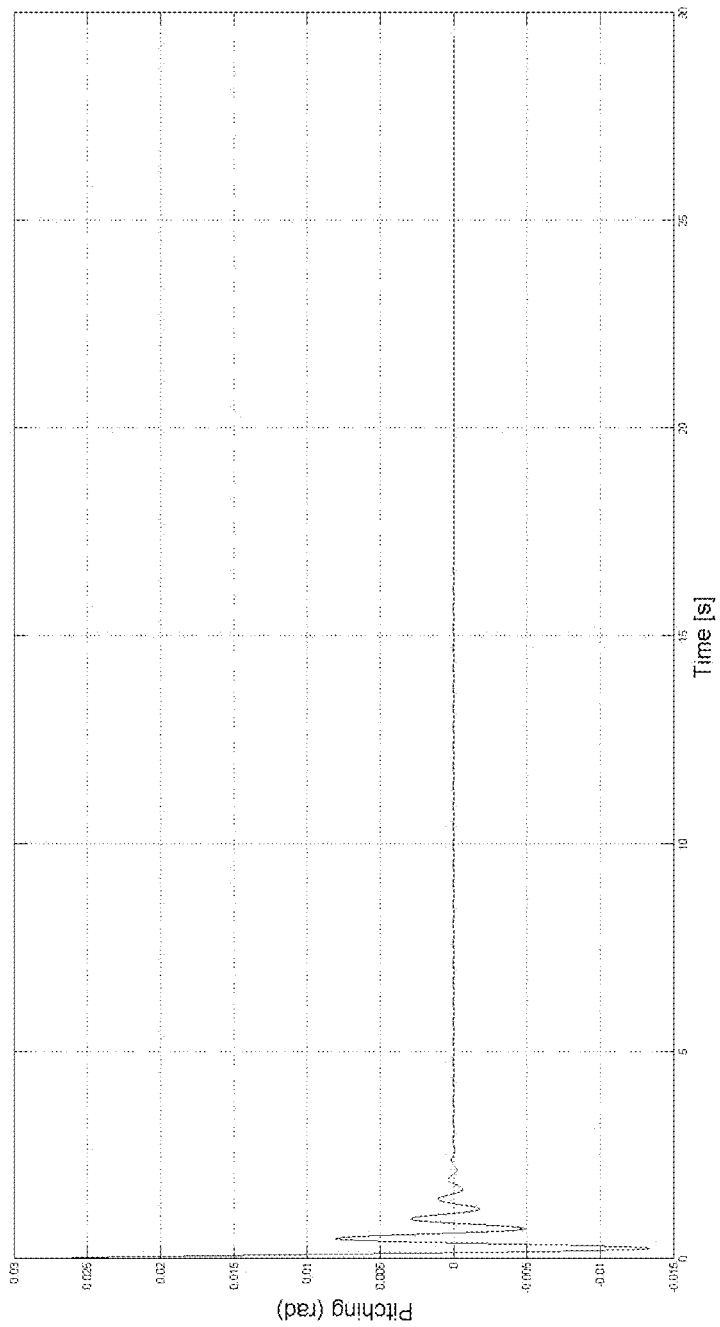
FIG. 16 plots the closed-loop pitching response for a free stream velocity U=19.5 m/s.
Figure 17:
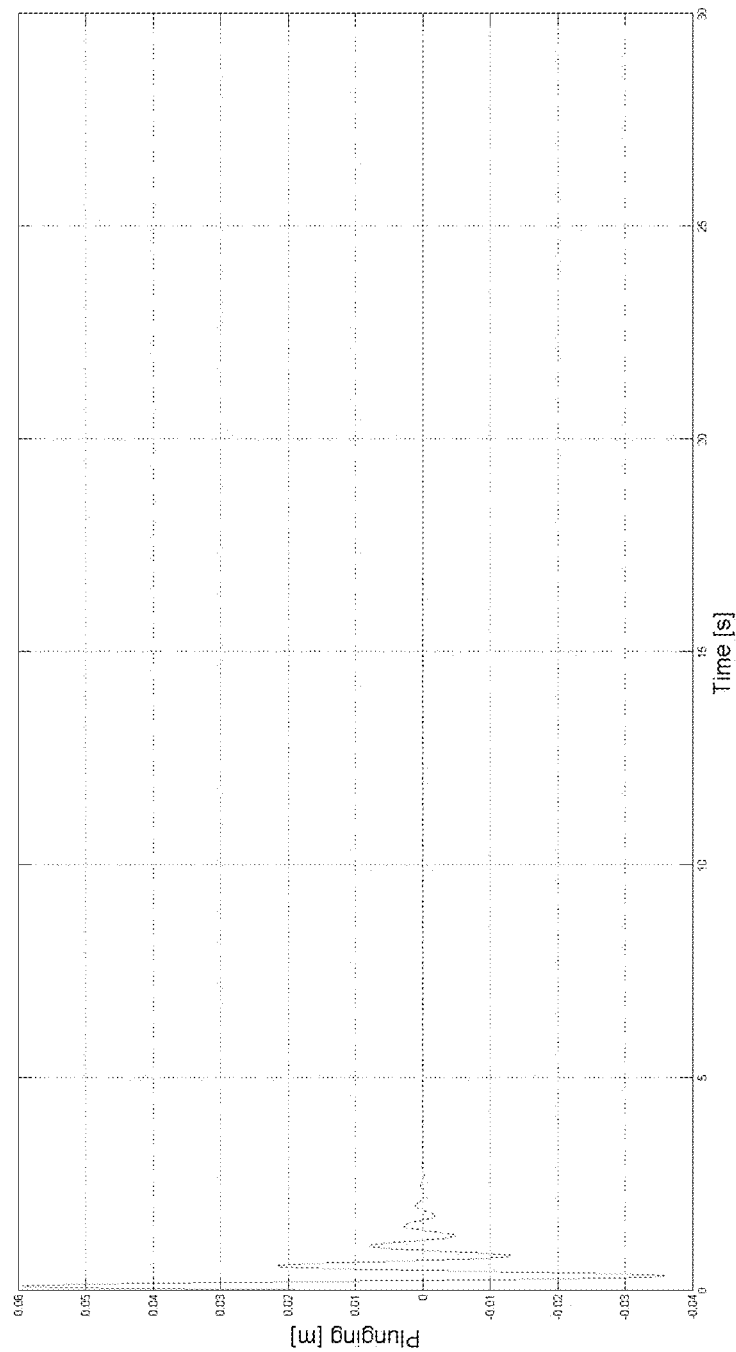
FIG. 17 plots the closed-loop plunging response for a free stream velocity U=19.5 m/s.
Figure 18:
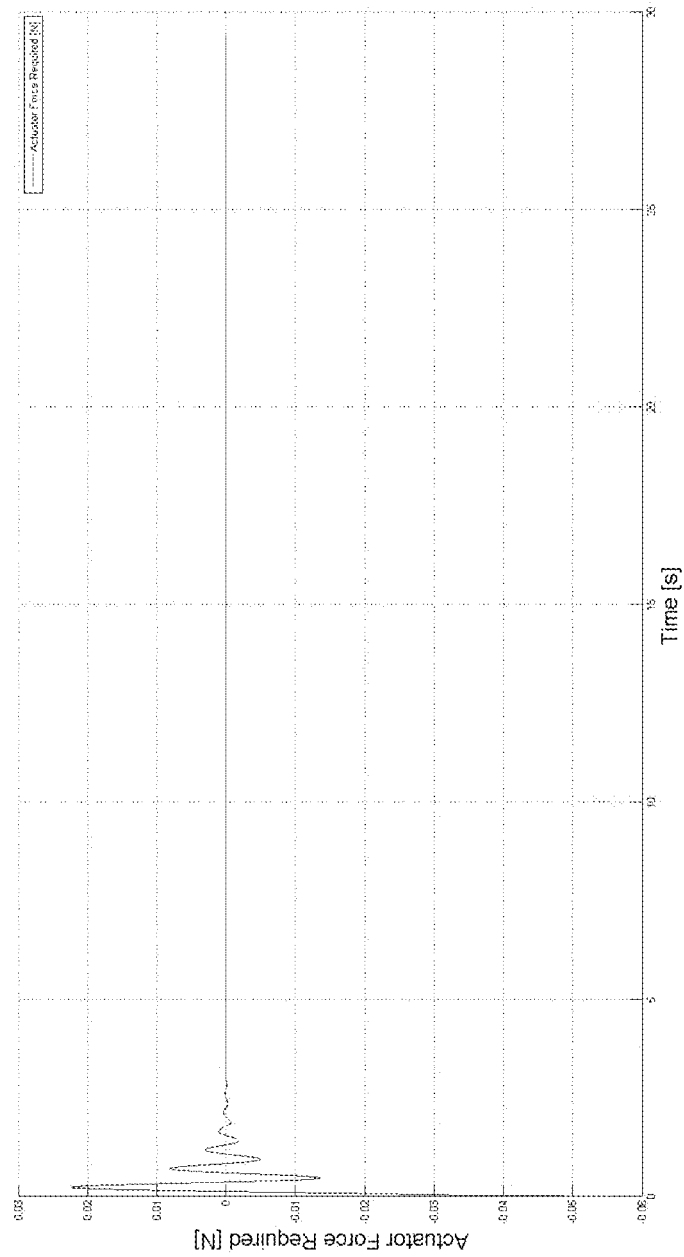
FIG. 18 plots the actuator force required for free stream velocity U=19.5 m/s.
Figure 19:
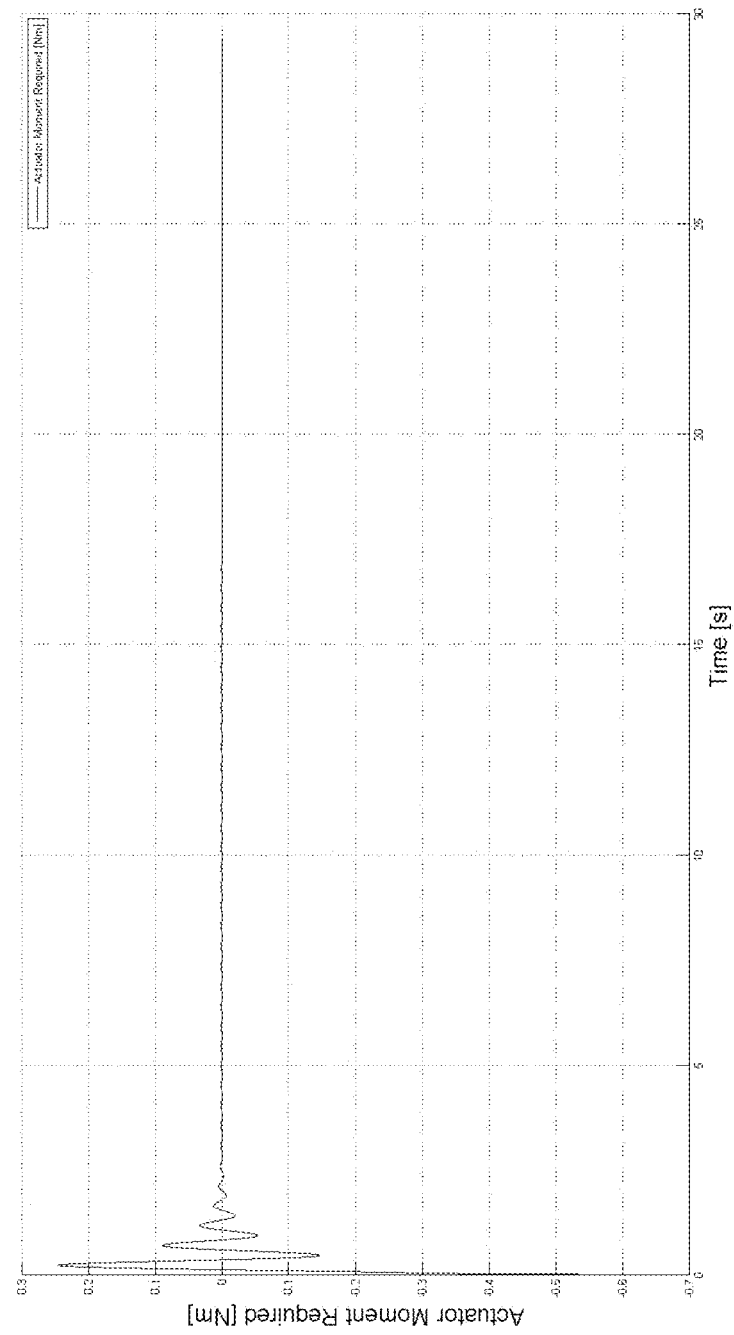
FIG. 19 plots the actuator moment required for free stream velocity U=19.5 m/s.
Figure 20:
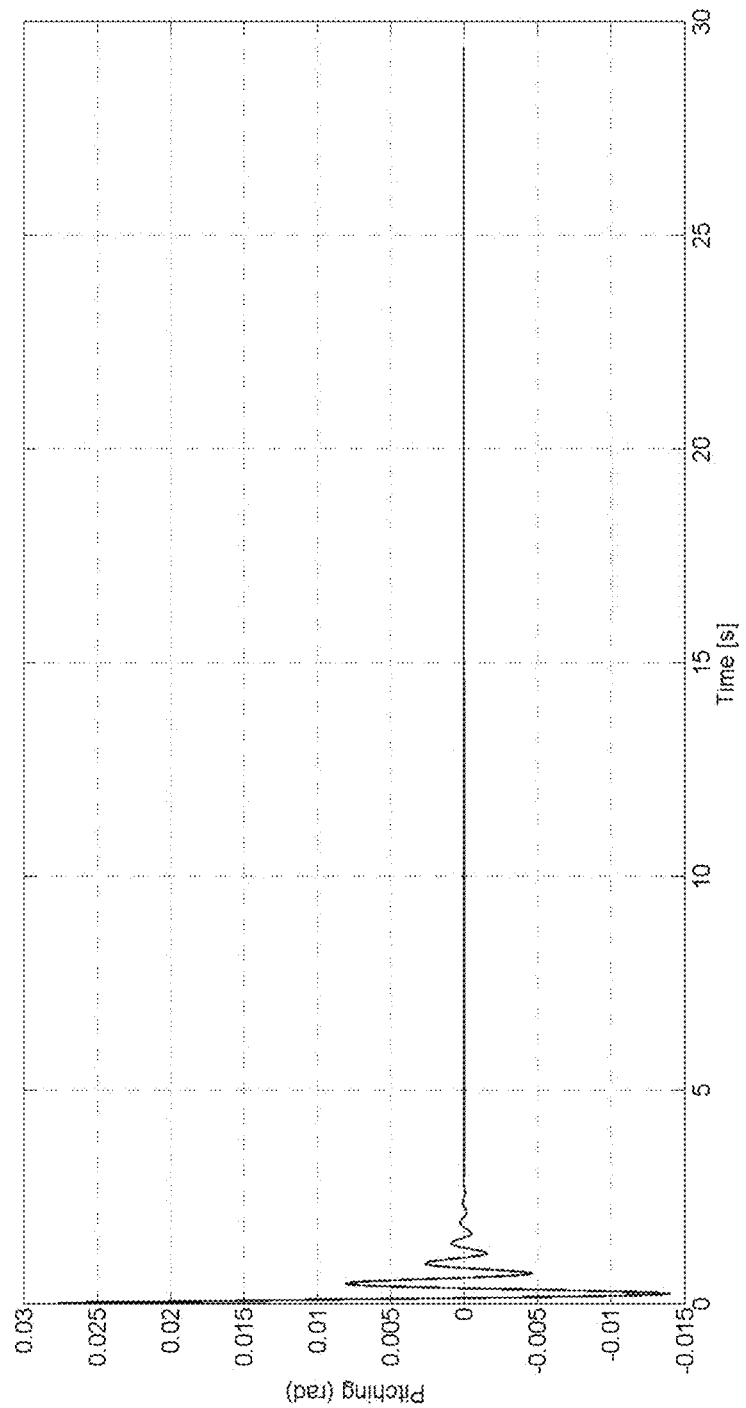
FIG. 20 plots the closed-loop pitching response for free stream velocity of U=20.5 m/s.
Figure 21:
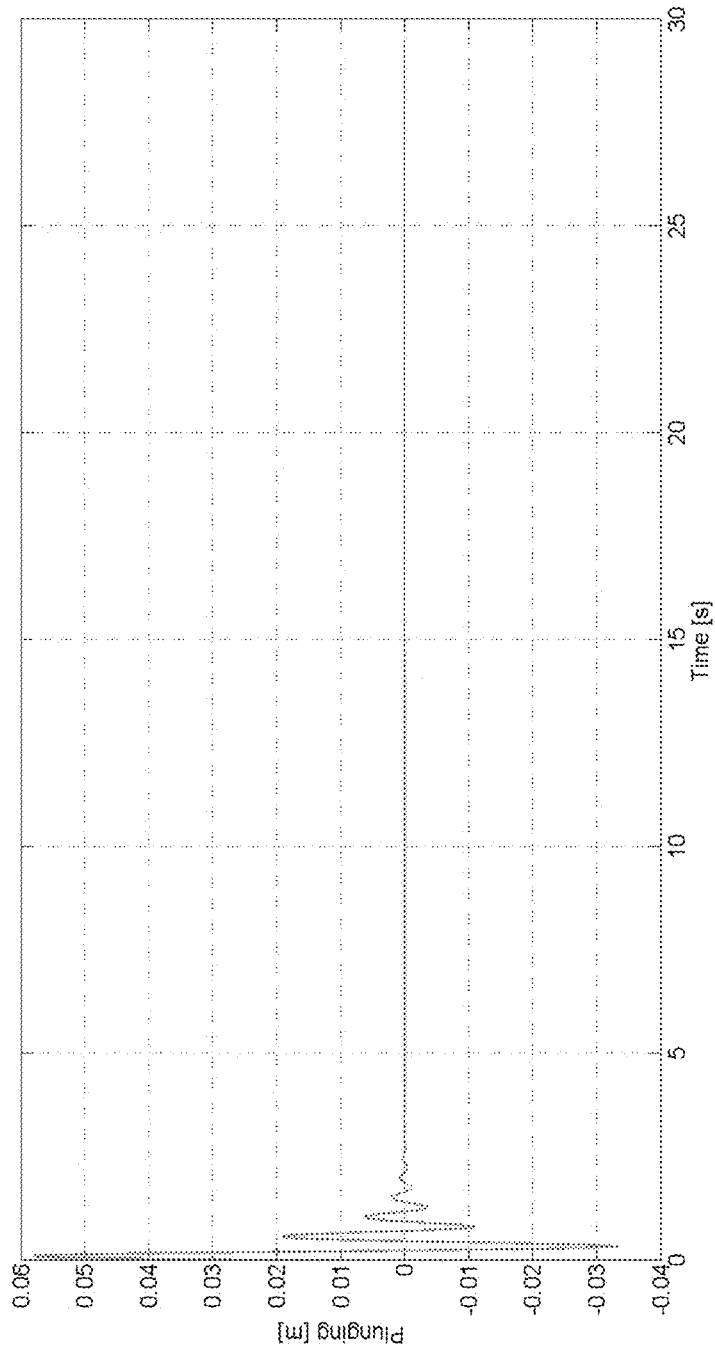
FIG. 21 plots the closed-loop plunging response for free stream velocity of U=20.5 m/s.
Figure 22:
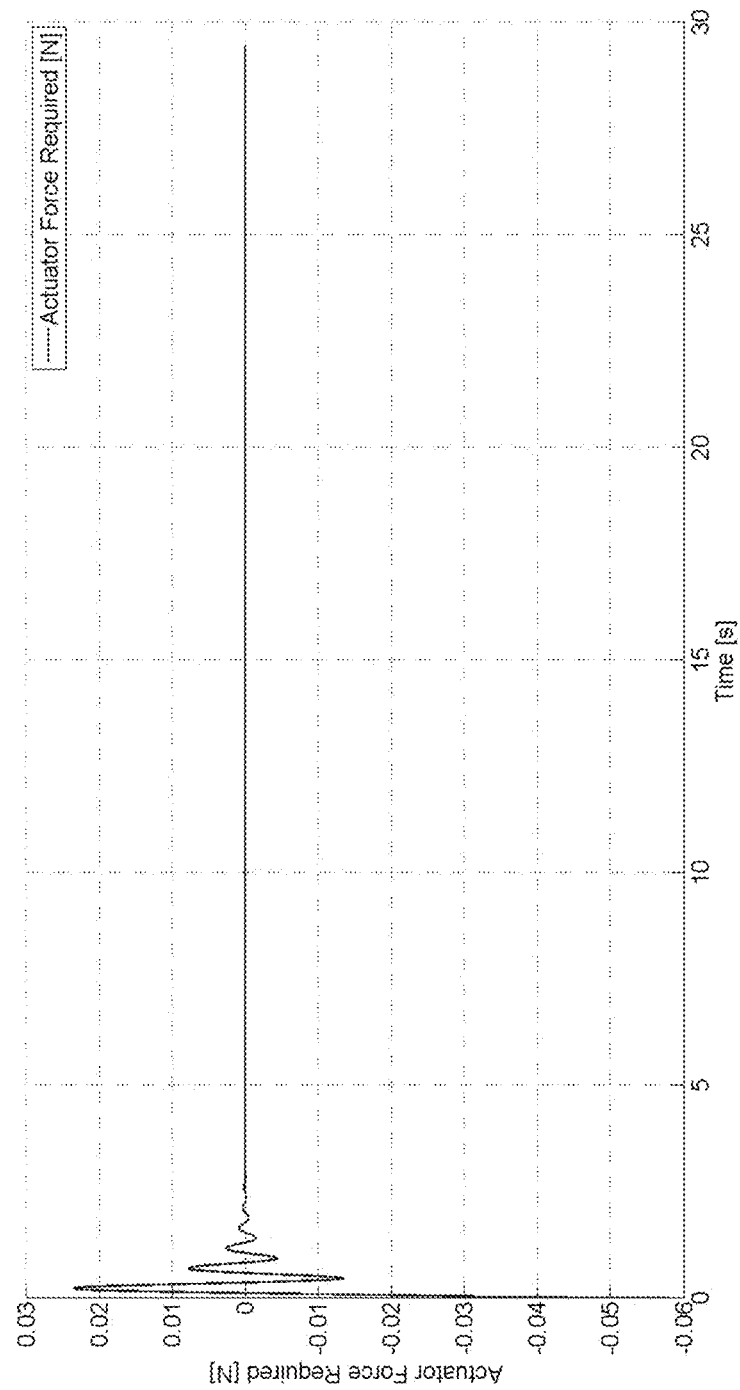
FIG. 22 plots actuator force required for free stream velocity of U=20.5 m/s.
Figure 23:
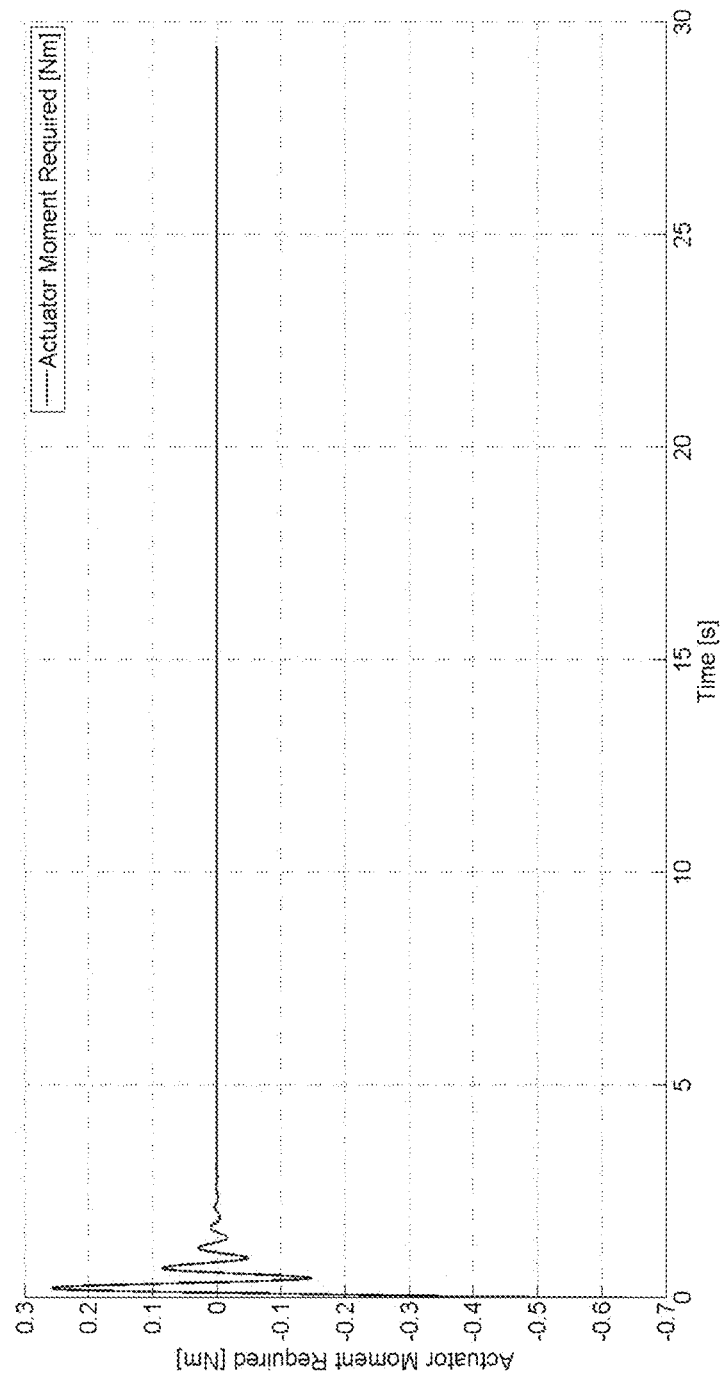
FIG. 23 plots the actuator moment required for free stream velocity of U=20.5 m/s.

FIGS. 8-11 show the open-loop pitching and plunging response of the simulated system for the case where the free stream velocity U is 18.25 m/s and 19.5 m/s, respectively. These figures demonstrate that sustained LCO occur in the absence of feedback control. FIGS. 12 and 13 show the closed-loop pitching and plunging response for the case where U=18.25 m/s, and FIGS. 14 and 15 show the required control force and moment, respectively, in this case. These simulation results demonstrate the capability of the robust control law to asymptotically suppress LCO using a control force and moment that are within reasonable limits. This demonstrates the practical efficacy of the control design to suppress LCO using the limited control authority that is available from the SJA. It should be noted, however, that in actual application, arrays consisting of several SJAs can be utilized to realize a greater overall control force and moment.

FIGS. 16-19 show the closed-loop pitching and plunging response and the required control force and moment, respectively, for the case where the free stream velocity U=19.5 m/s. FIGS. 20-23 show the closed-loop pitching and plunging response and the required control moment and force for the case where U=20.5 m/s. As shown in the figures, an increased control effort is required to suppress the LCO in the presence of the increased air velocity.

Figure 24:
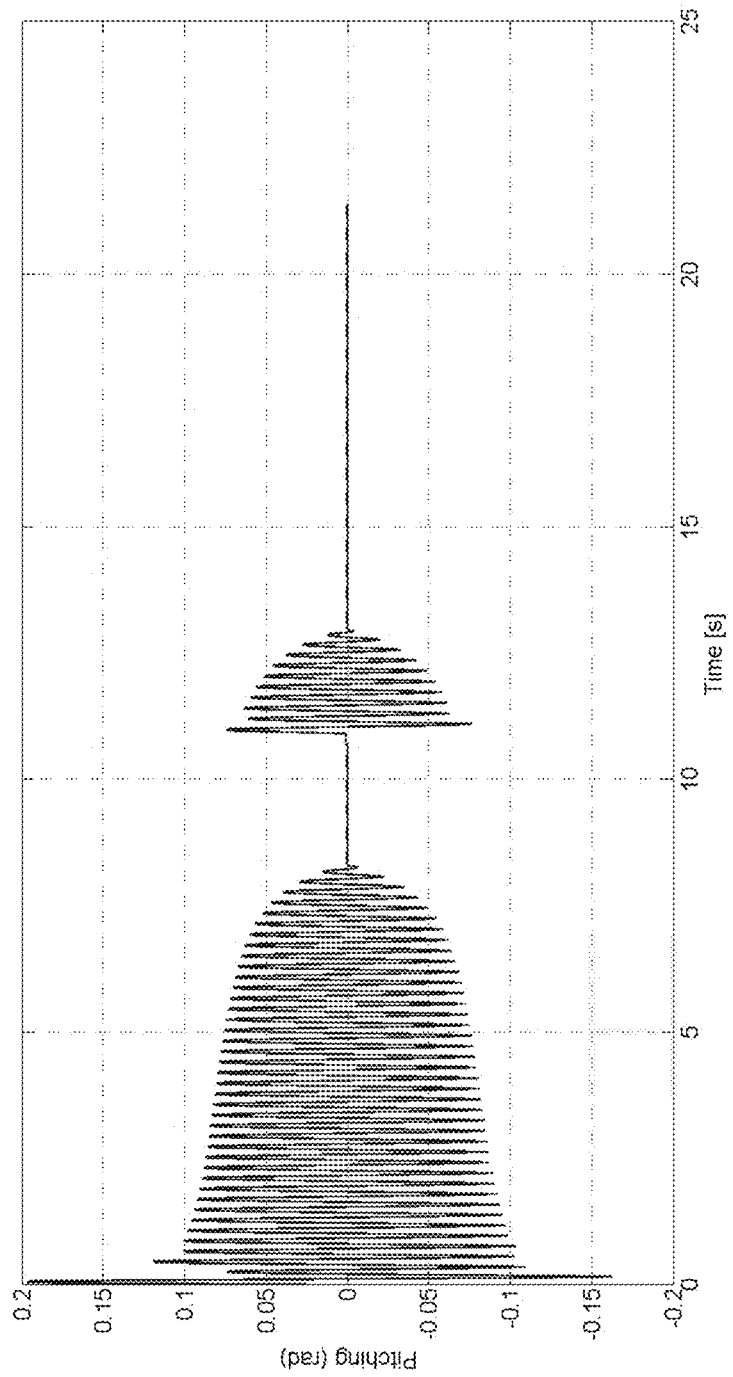
FIG. 24 plots a closed-loop pitching response in the presence of a disturbance.
Figure 25:
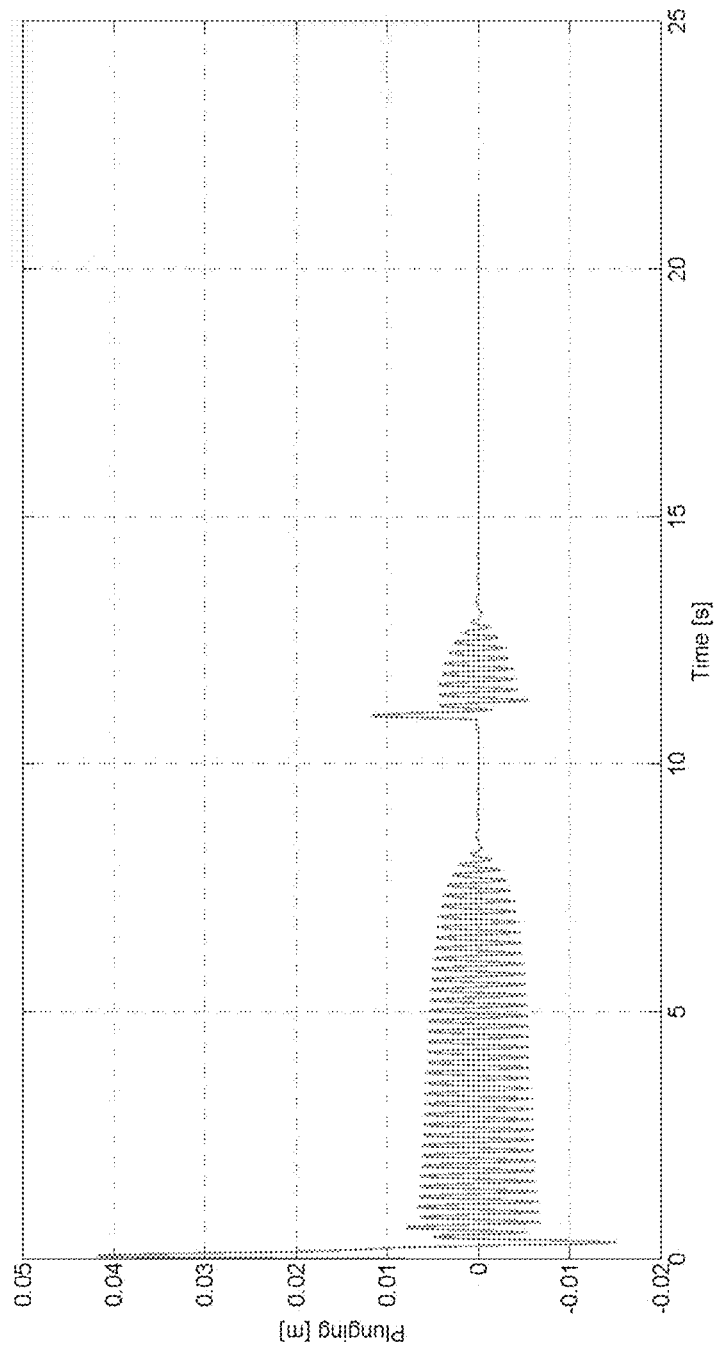
FIG. 25 plots the closed-loop plunging response in the presence of a disturbance.
Figure 26:
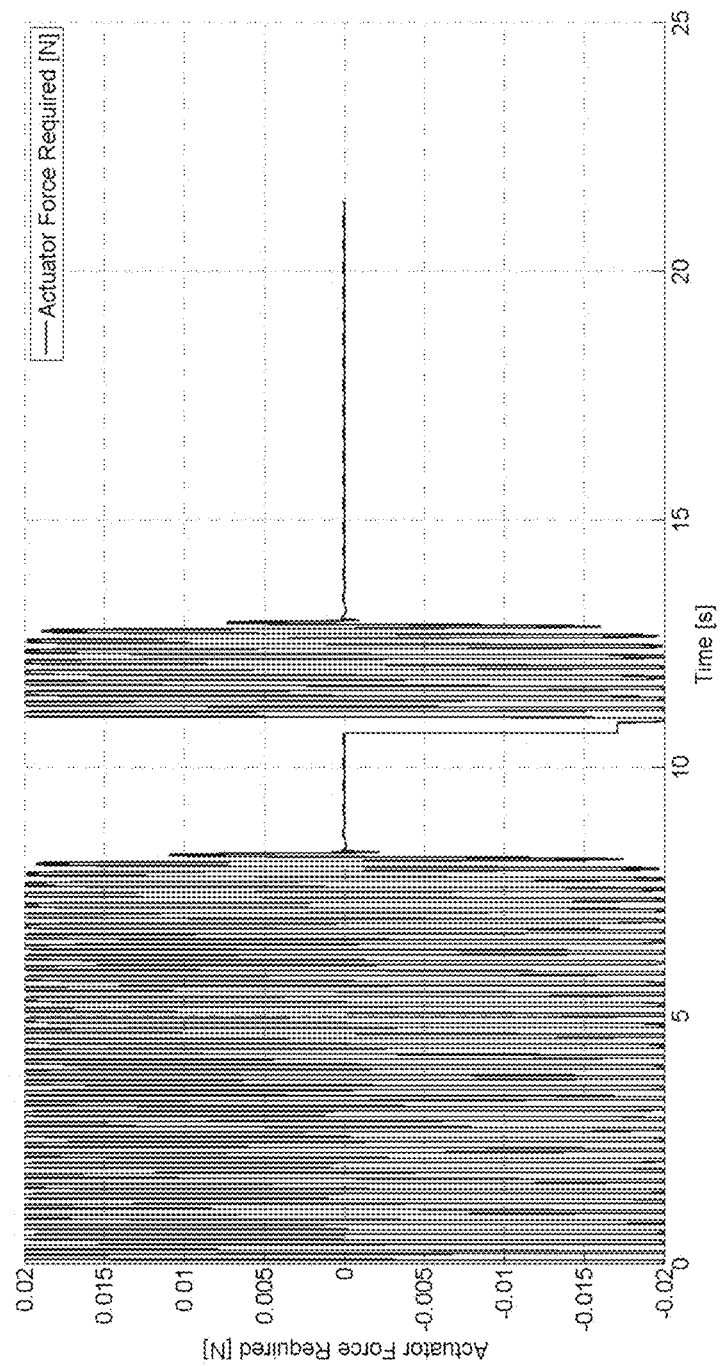
FIG. 26 plots actuator force used in the presence of the disturbance of FIGS. 24 and 24.
Figure 27:
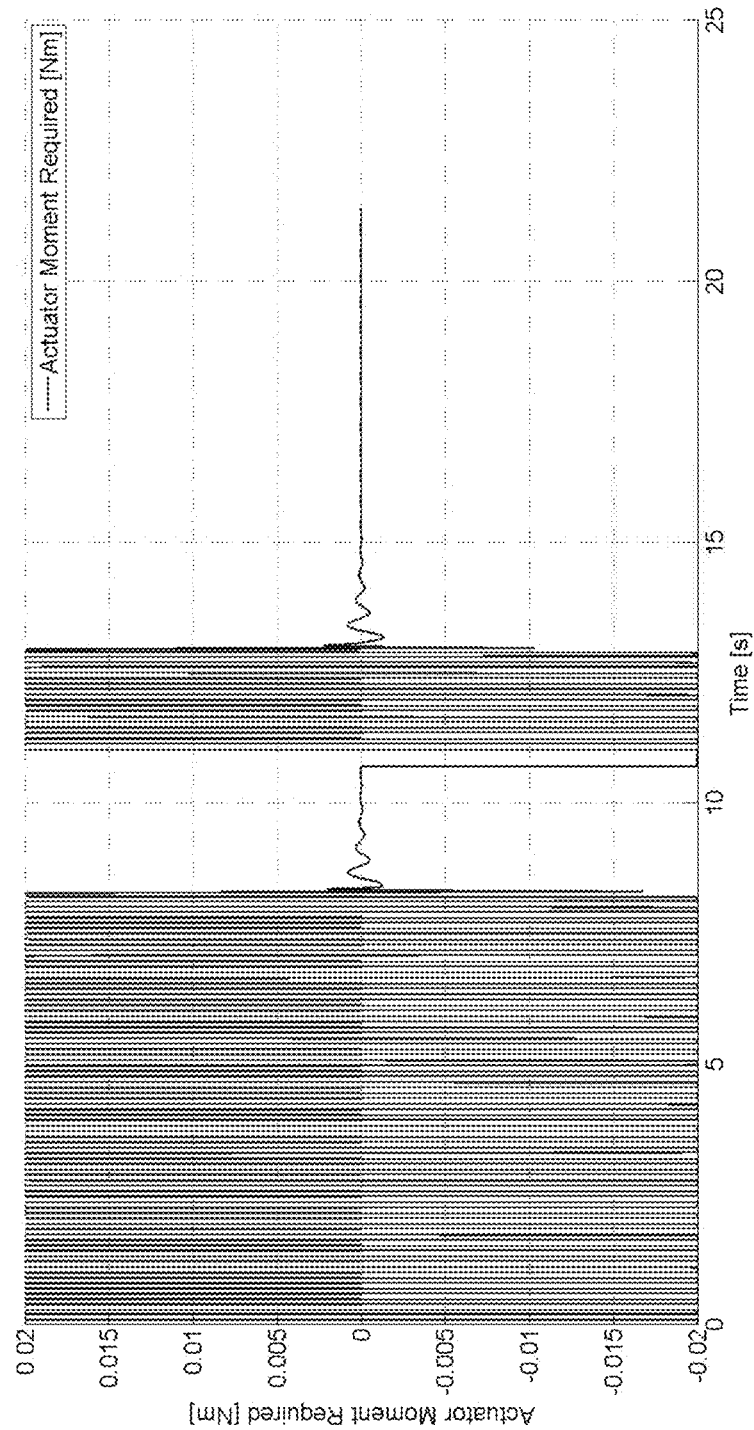
FIG. 27 plots actuator moment in response to the disturbance of FIGS. 24 and 25.

FIGS. 24 and 25 show the robustness of the proposed controller in the event of sudden un-modeled disturbances. In these plots, a sudden increase (i.e., step function) in the pitching and plunging rates was programmed to occur at 10.9 s. Simultaneously, the free stream velocity U was increased from 19 m/s to 25 m/s for approximately 0.2 seconds to simulate a disturbance due to a wind gust. The pitching and plunging responses in FIGS. 24 and 25 demonstrate the capability of the control law to compensate for the sudden and unexpected disturbances. FIGS. 26 and 27 show the commanded control force and moment, respectively, of the closed-loop system in response to the disturbance.

Example 3: Numerical Approach

To demonstrate the developed SJA-based robust flight control technology, a high-fidelity numerical approach is examined which employs a modified version of the Implicit Large Eddy Simulation (ILES) Navier-Stokes solver. The following features of the original version of the code are particularly beneficial for the analysis of fluid-structure interaction and its control:

Implicit time marching algorithms (up to 4th-order accurate) are particularly suitable for the low-Reynolds number wall-bounded flows characteristic of MAV airfoils.

High-order spatial accuracy (up to 6th-order accurate) is achieved by use of implicit compact finite-difference schemes, thus making LES resolution attainable with minimum computational expense.

Robustness is achieved through a low-pass Pade-type non-dispersive spatial filter that regularizes the solution in flow regions where the computational mesh is not sufficient to fully resolve the smallest scales. Note that the governing equations are represented in the original unfiltered form used unchanged in laminar, transitional or fully turbulent regions of the flow. The highly efficient Implicit LES (ILES) procedure employs the high-order filter operator in lieu of the standard SGS and heat flux terms, with the filter selectively damping the evolving poorly-resolved high-frequency content of the solution.

Overset grid technique is adopted for geometrically complex configurations, with high-order interpolation maintaining spatial accuracy at overlapping mesh interfaces. The code employs an efficient MPI parallelization that has been successfully utilized on various Beowulf cluster platforms.

The present example employs the developed in the code and successfully validated capability to simulate the coupled aerodynamic and aeroelastic responses of 1-DOF and 2-DOF elastically-mounted airfoils (FIG. 1) and their transition to LCO induced by an impinging gust. The aeroelastic response module has been implemented within the framework of the viscous flow solver. In the numerical formulation, the equations governing the fluid dynamics are essentially coupled with equations governing 1-DOF or 2-DOF airfoil motion so that the fluid and structure are treated as a single dynamical system. In the time-marching procedure, the aerodynamic loads are supplied through Navier-Stokes simulations while the structural response module determines the displacement vector which, in turn, defines the grid motion. At each physical time step, the internal iterative loop achieves the balance of the new airfoil position and the corresponding unsteady flowfield. The loop is efficiently merged with the sub-iterative procedure implemented as part of the flow solver's implicit time marching scheme.

Figure 28:
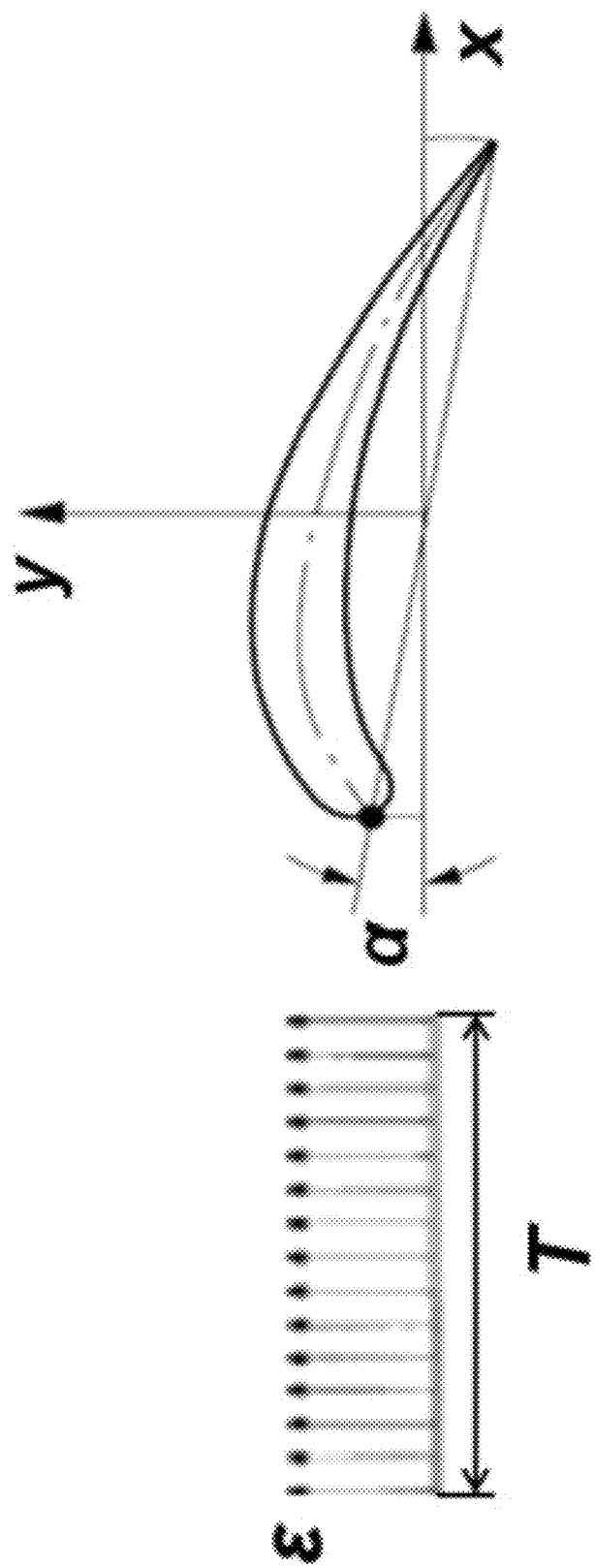
FIG. 28 illustrates a sharp-edge gust-airfoil interaction model.

In this example, the airfoil's LCO is induced by an impinging sharp-edge gust, with details of the numerical implementation of the gust-airfoil interaction model (FIG. 28). The model is analytically described in terms of the upwash velocity profile (with the streamwise component $u_g(x,t)=0$) in Eqn. (1b below).

$$v_g(x,t) = \begin{cases} \epsilon_g f(t - x/u_\infty), & u_\infty(t - T_g) \leq x \leq u_\infty t \\ 0, & \text{otherwise} \end{cases} \quad (1b)$$

In numerical simulations, such gust is generated with prescribed duration $T_g$ and the gust amplitude $\epsilon_g$ in the momentum source region located upstream of the airfoil, and undergoes ramp-up and ramp-down phases similar to natural flows as represented by function $f$ in Eqn. (1b).

The present example addresses effectiveness of SJA (e.g., FIG. 3) for active control of unsteady flow over SD7003 low-Re airfoil in presence of a sharp-edge gust, where only the actuator's orifice with a properly defined fluctuating-velocity boundary condition specified by Eqn. (2b) is embedded into the airfoil surface to allow for the synthetic jet to freely interact with the grazing boundary-layer flow.

$$v_{SJA}(x,t) = A \cos(\omega_{SJA} t) \quad (43)$$

Figure 29:
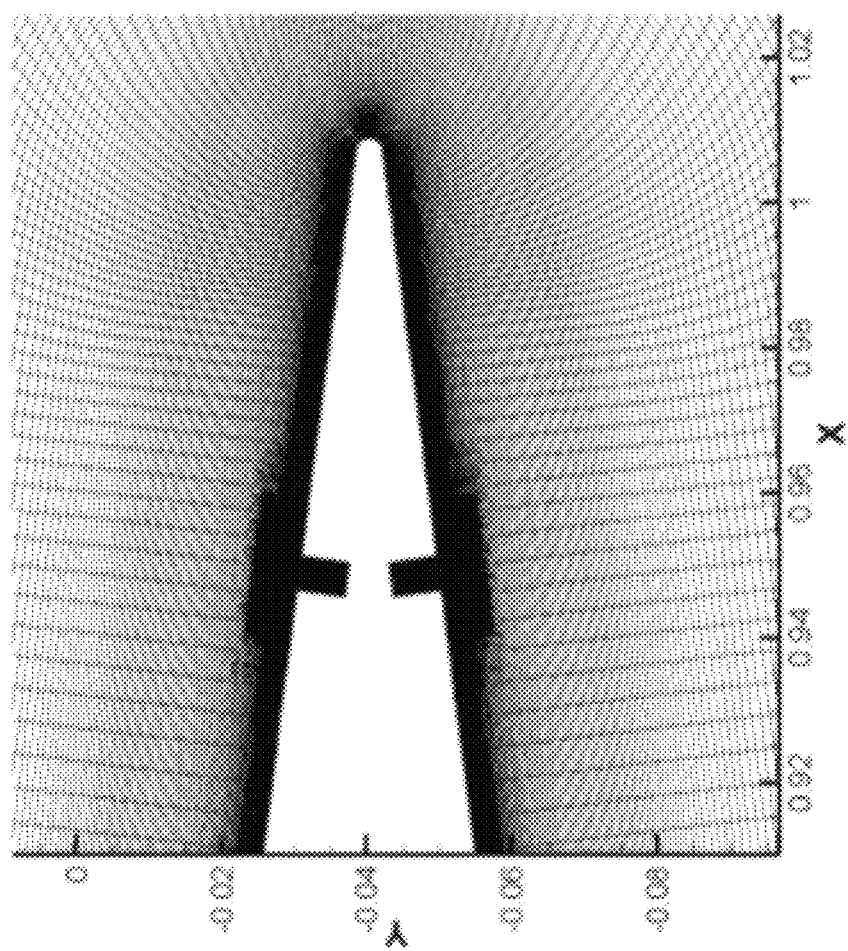
FIG. 29 illustrates example details of a numerical grid.

The present example addresses SJA-based robust control of gust-induced LCO in NACA0012 airfoil. The near-airfoil region of the baseline 649×395×3 O-grid is illustrated in FIG. 29. The freestream conditions are imposed at the farfield boundary located more than 100 chords away from the airfoil, with the grid rapidly stretching towards the boundary to ensure effective elimination of spurious reflections achieved in conjunction with the low-pass spatial filtering. The synthetic-jet actuators embed the actuator's orifice mesh in the airfoil surface and provide an adequate overlap with the original airfoil mesh (FIG. 29). The proper implementation of the employed overset grid methodology involves 7 meshes generated using Pointwise© software in the near-orifice overlap region for each of the two actuators symmetrically positioned on the top and the bottom airfoil surfaces at 0.95 c chordwise locations on each side. The overset grid connectivity is established using NASA'S PEGASUS and AFRL's BELLERO software, with the connectivity data produced by the former serving as input for the latter handling grid decomposition and establishing the intra-grid communication required for the grid system subdivided into blocks for parallel processing.

A fixed time step of $\Delta t \approx 5 \times 10^{-5}$ is used in the code parallel simulations, with the baseline mesh efficiently partitioned into a set of 572 overlapped blocks assigned to different processors. Such computations require about 10 CPU hours on a DOD HPC system to establish a clearly-defined LCO in approximately $10^6$ time steps.

TABLE 3

| | | |
|---|---|---|
| $\rho$ = 1.1 kg/m$^3$ | b = 0.11 m | a = −0.024 m |
| m = 2.55 kg | $a_1$ = 0.165 | $a_2$ = 0.0455 |
| $S_a$ = 1.04 × 10$^{-2}$ kg · m | $b_1$ = 0.335 | $b_2$ = 0.300 |
| $I_a$ = 2.51 × 10$^{-3}$ kg · m | $k_a$ = 9.3 N/m | $k_a^3$ = 55 N/m |
| $k_a$ = 450 N/m | $\zeta_h$ = 5.5 × 10$^{-3}$ | $\zeta_a$ = 1.8 × 10$^{-3}$ |

Figure 30A:
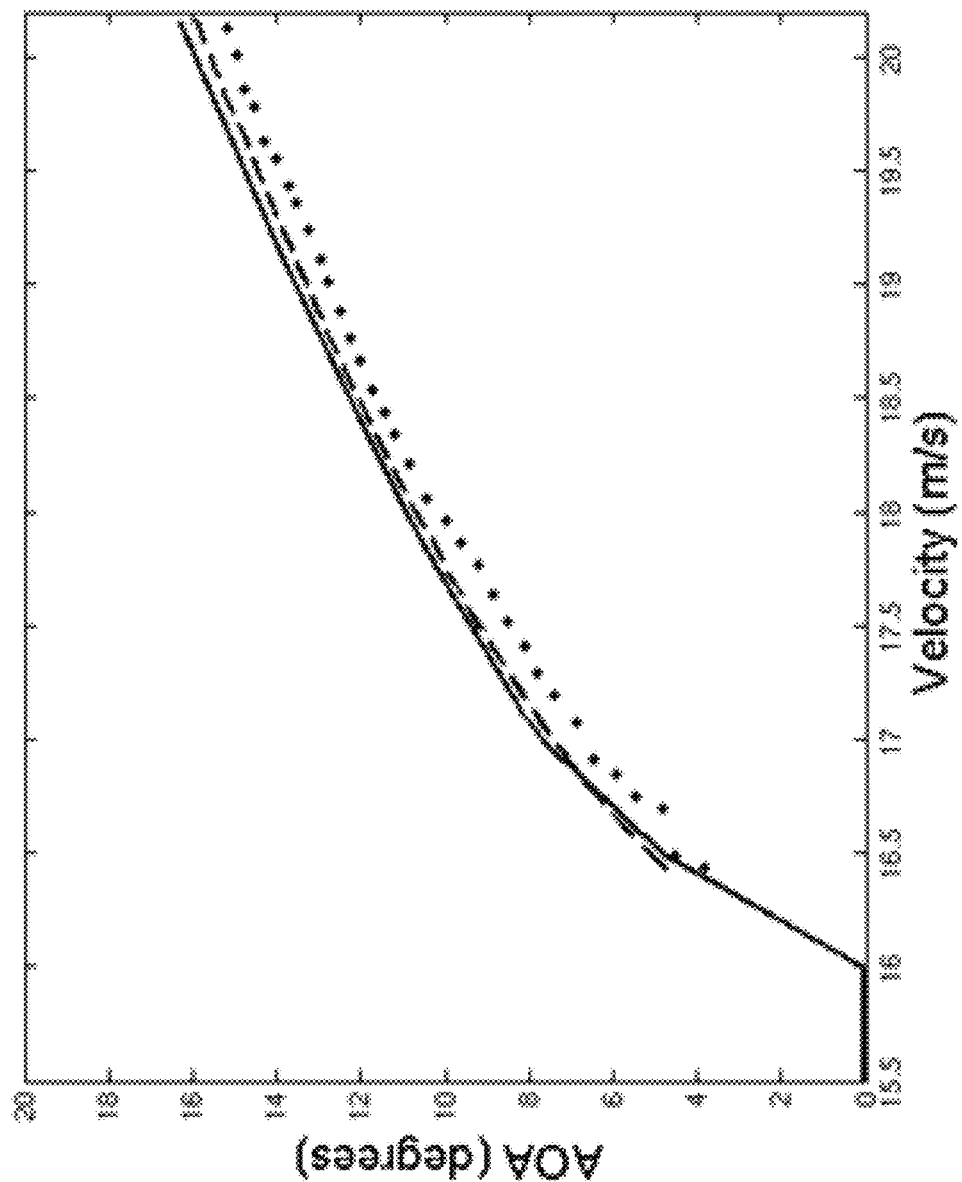
FIG. 30a illustrates flat plate pitching LCO amplitudes.
Figure 30B:
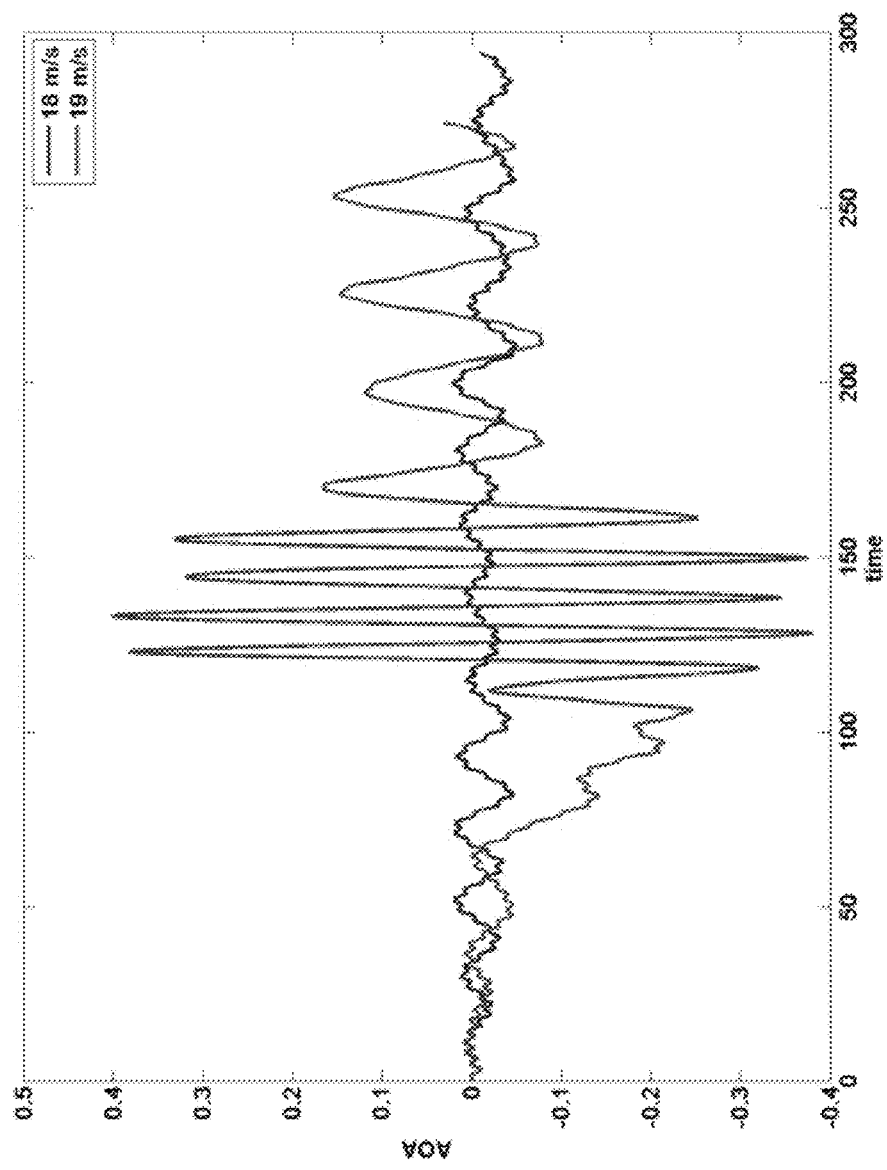
FIG. 30b illustrates time histories of airfoil pitching responses.

A representative set of the aeroelastic model's parameters shown in Table 3 was selected to provide a realistic model of elastically-mounted NACA0012 wing section. The structural parameters were employed to match a critical (flutter) speed of about 16 m/s. FIG. 30a shows comparison of the pitching experimental results. The corresponding transition to pitching LCO induced by an impinging sinusoidal gust predicted based on the high-accuracy simulations for 18 and 19 m/s is shown in FIG. 30b. Note that the latter reveals the LCO frequency and amplitude shifts in the structural response. However, the comparison of the quasilinear and nonlinear structural response models indicates different transient processes towards establishing similar final LCO patterns with a phase shift. In particular, the response frequency analysis of the quasilinear model reveals a transient region characterized by a high-amplitude LCO at $\omega_{LCO}$ ~0.6 that abruptly switched to the lower-amplitude LCO at $\omega_{LCO}$~0.2, whereas the nonlinear model reached such long-term response through continuous spectral shifts with lower-amplitude transient modes.

Figure 31B:
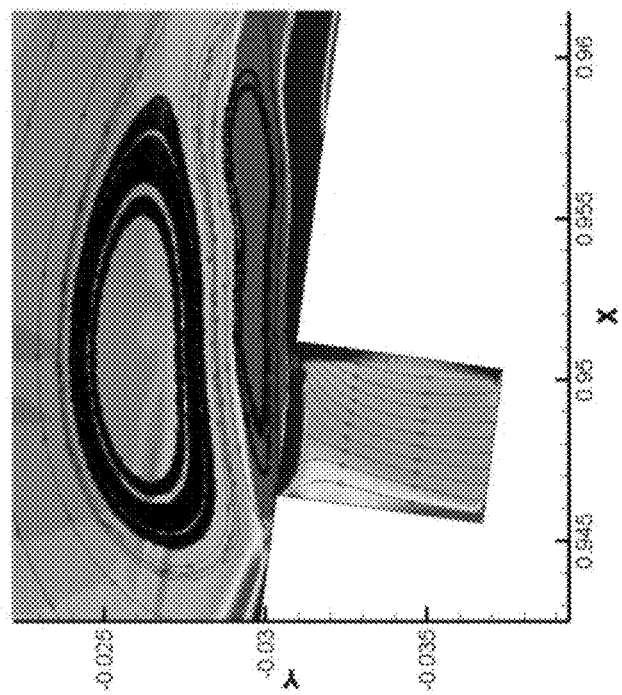
FIGS. 31a and 31b illustrate example vorticity and streamline contours with suction-side actuation.
Figure 31A:
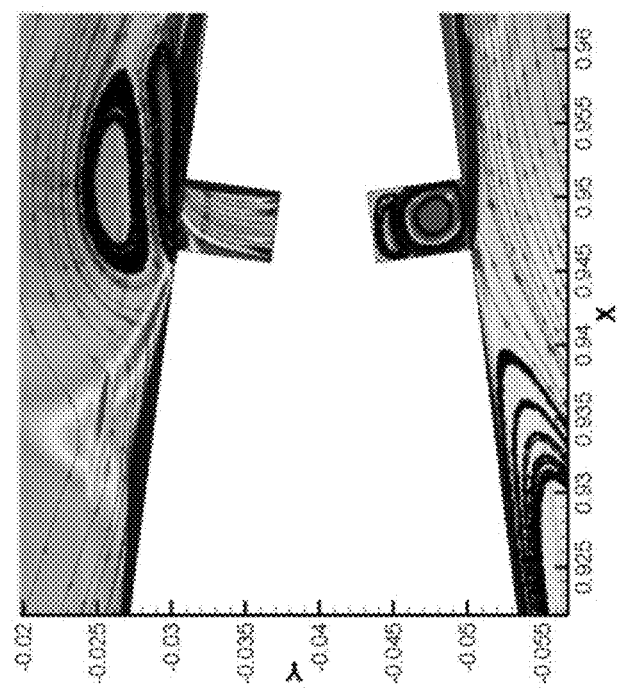

FIG. 31 illustrates vorticity and streamline contours for the suction-side actuation based on the numerical experiments performed with actuators embedded on both sides of the airfoil close to the trailing edge.

Figure 32A:
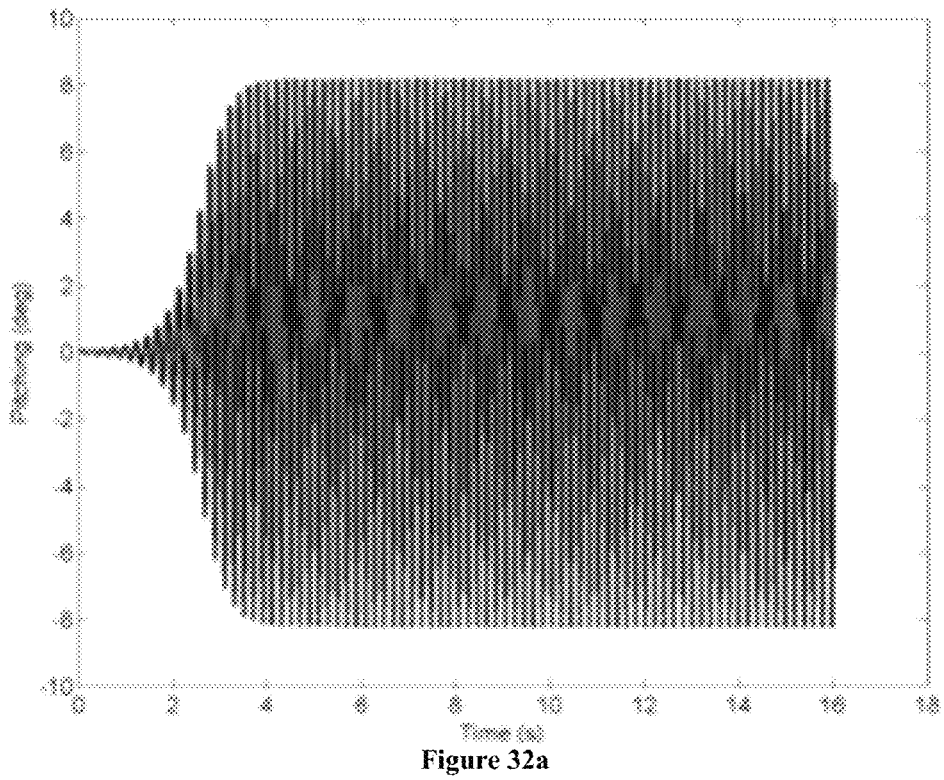
FIGS. 32a-c illustrate a transition to uncontrolled pitching LCO for increasing amplitudes of initial excitation.
Figure 32B:
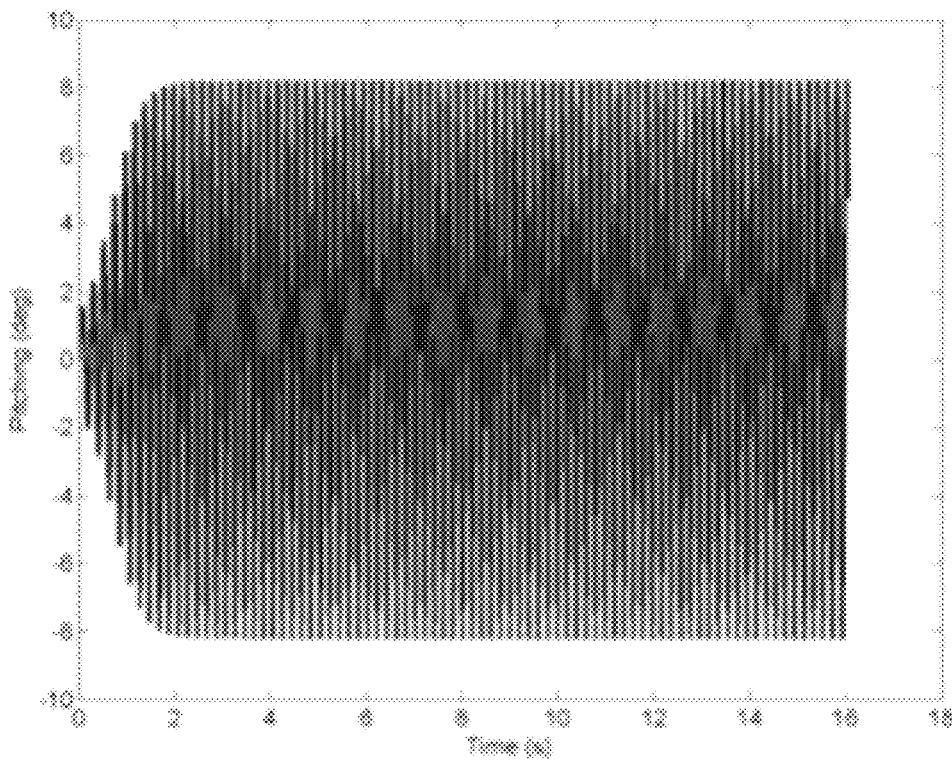
Figure 32C:
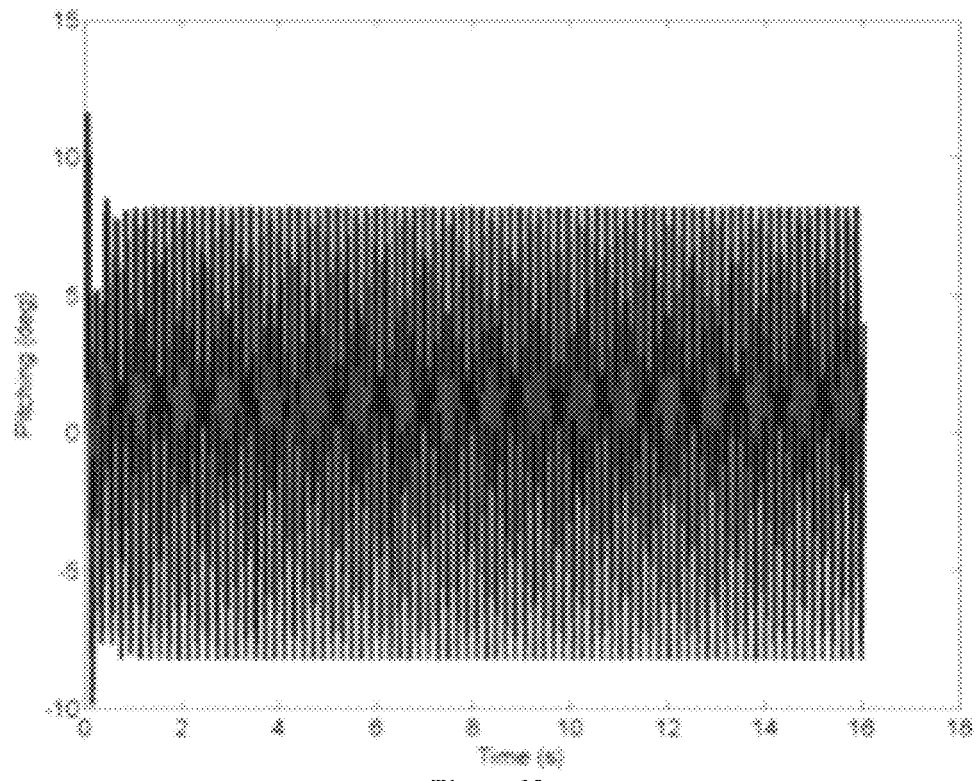

FIG. 32 first illustrates results of the reduced-order simulations for uncontrolled 2-DOF flat-plate pitching LCO obtained for the flow speed of 19 m/s for three initial airfoil excitation amplitudes corresponding to $\epsilon_l = \bar{p}(0) = (0.002, 0.005)$, $\epsilon_m = \bar{p}(0) = (0.1, 0.2)$ and $\epsilon_h = \bar{p}(0) = (1, 2)$ (the state vector p(t) is defined in Eqn. (2)). Clearly, the final LCO amplitudes are the same in all cases but the transition process is different. The plunging LCO characteristics have very similar features and thus are not shown.

The required control authority of the actuators changes correspondingly depending on the initial excitation and the LCO amplitudes (i.e., the flow speed, as shown in FIG. 30a). Test computations are performed for the following selection of the control gains in the robust controller model:

$$a_1 = \begin{bmatrix} 1 & 0 \\ 0 & 35 \end{bmatrix}, a_2 = \begin{bmatrix} 1 & 0 \\ 0 & 35 \end{bmatrix}, k_3 = \begin{bmatrix} 10^{-7} & 0 \\ 0 & 9 \times 10^{-4} \end{bmatrix}, \beta = \begin{bmatrix} 10^{-3} & 0 \\ 0 & 25 \end{bmatrix} \quad (3b)$$

Figure 33A:
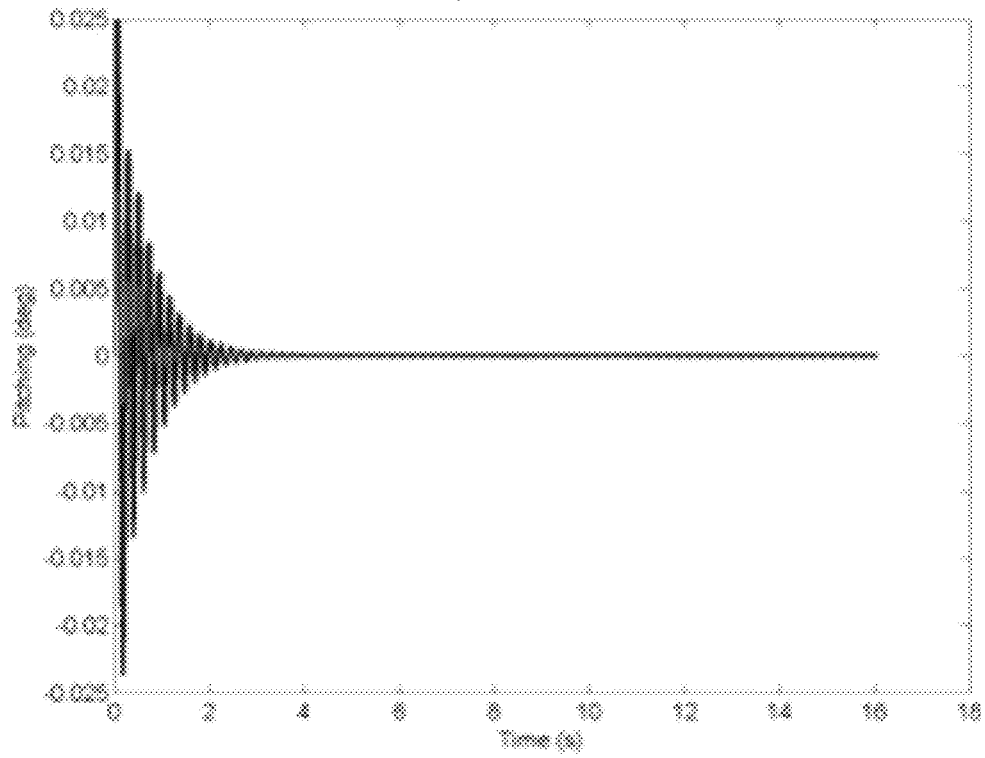
FIGS. 33a-c illustrate an example of suppression of pitching LCO achieved by the feedback-loop robust control system with increasing amplitudes of initial excitation.
Figure 33B:
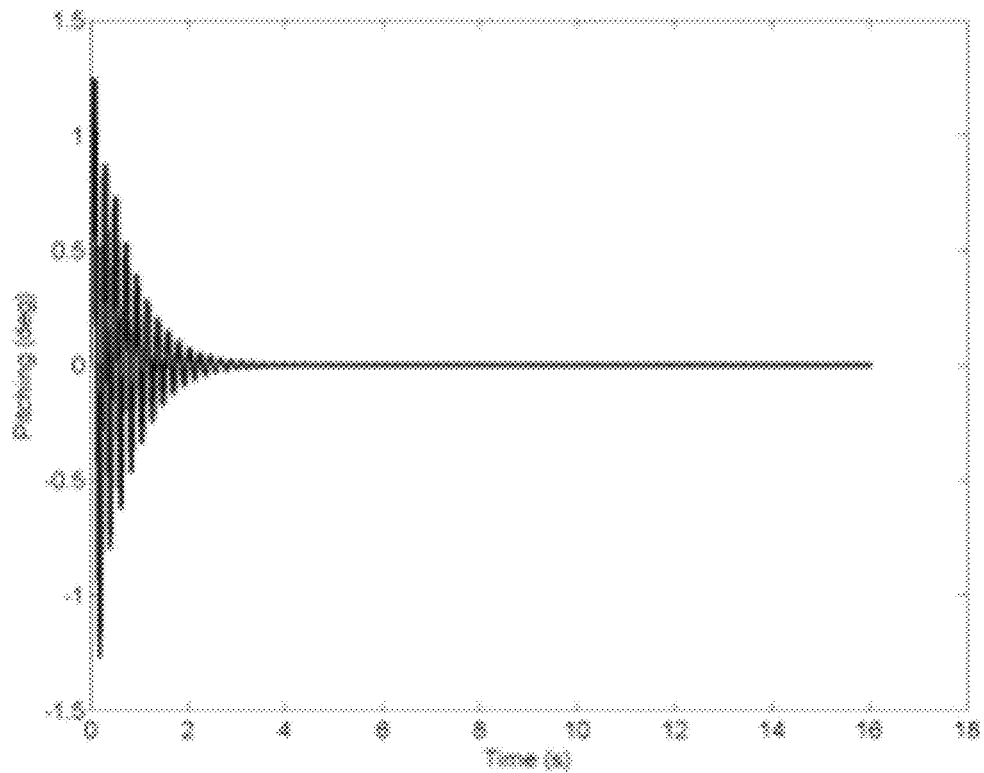
Figure 33C:
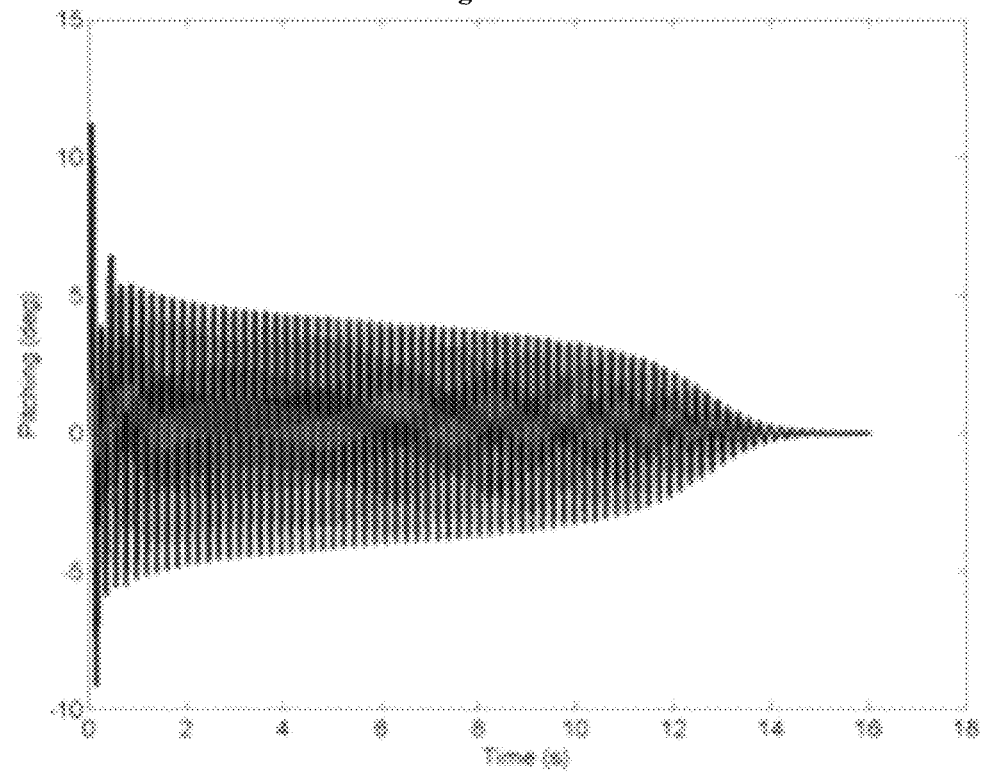
Figure 34A:
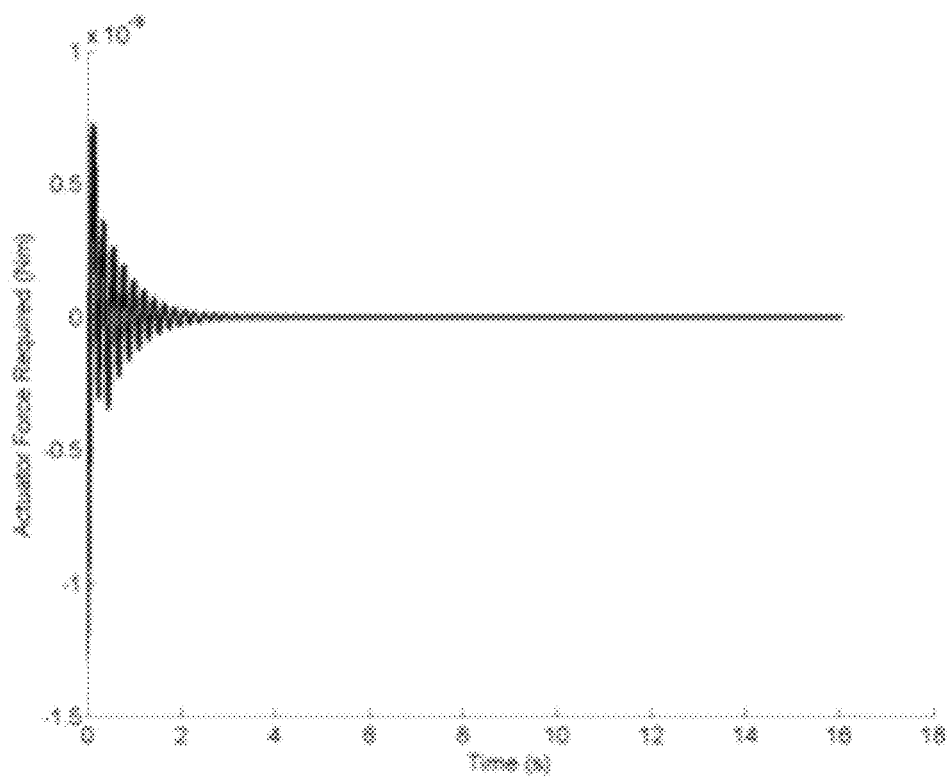
FIGS. 34a-f illustrate an actuator's control authority requirements for aerodynamic lift and moment with increasing amplitudes of initial excitation.
Figure 34B:
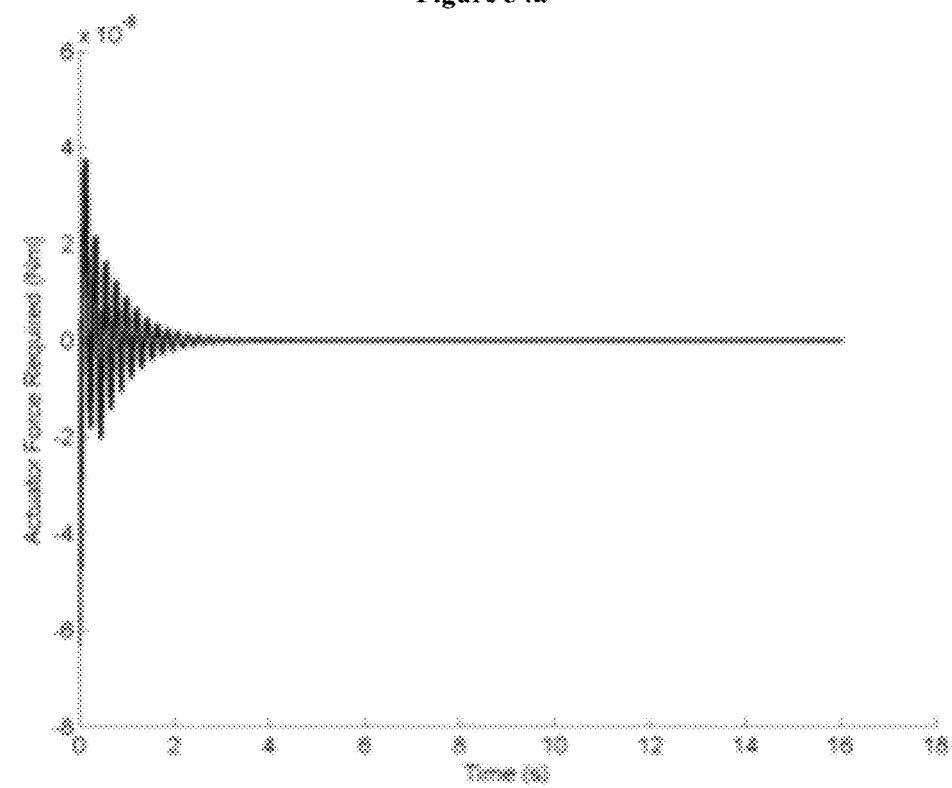
Figure 34C:
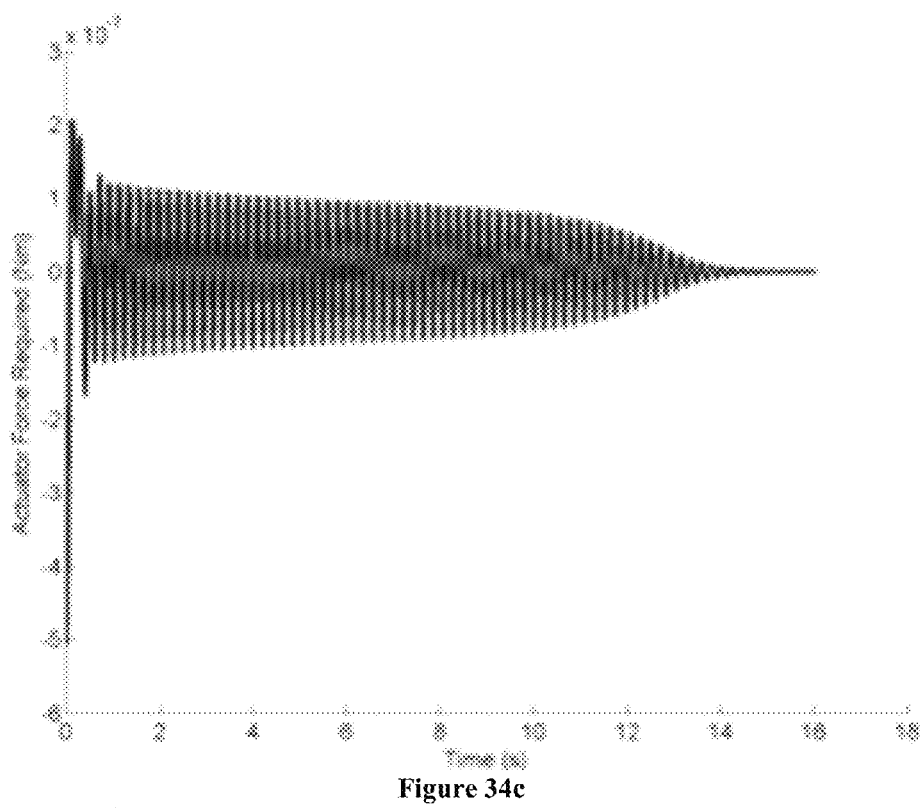
Figure 34D:
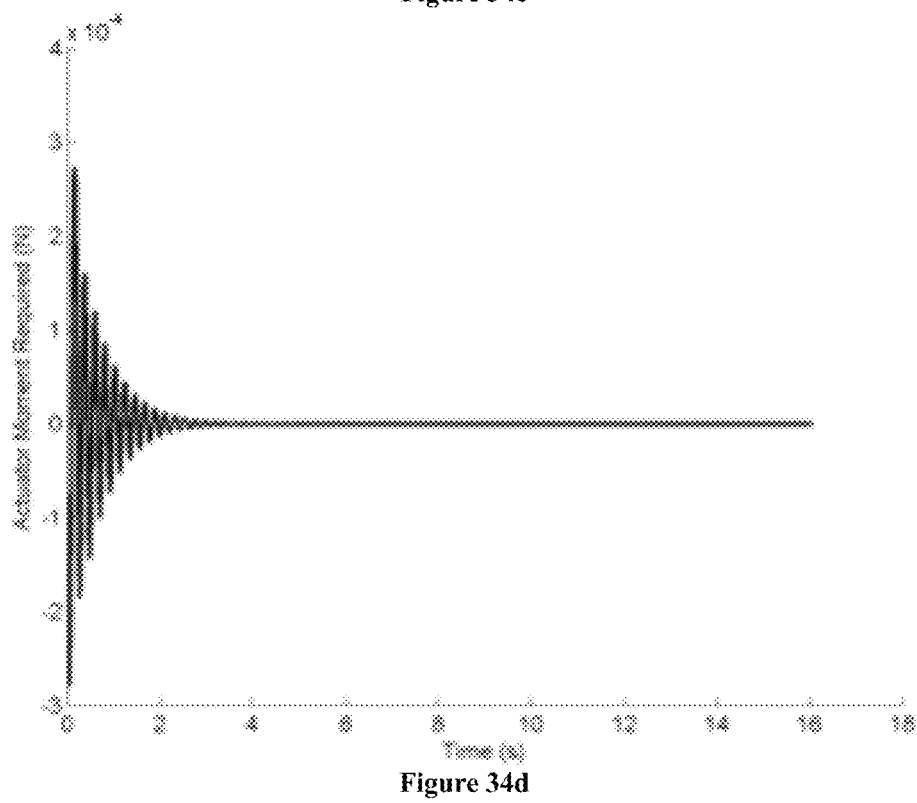
Figure 34E:
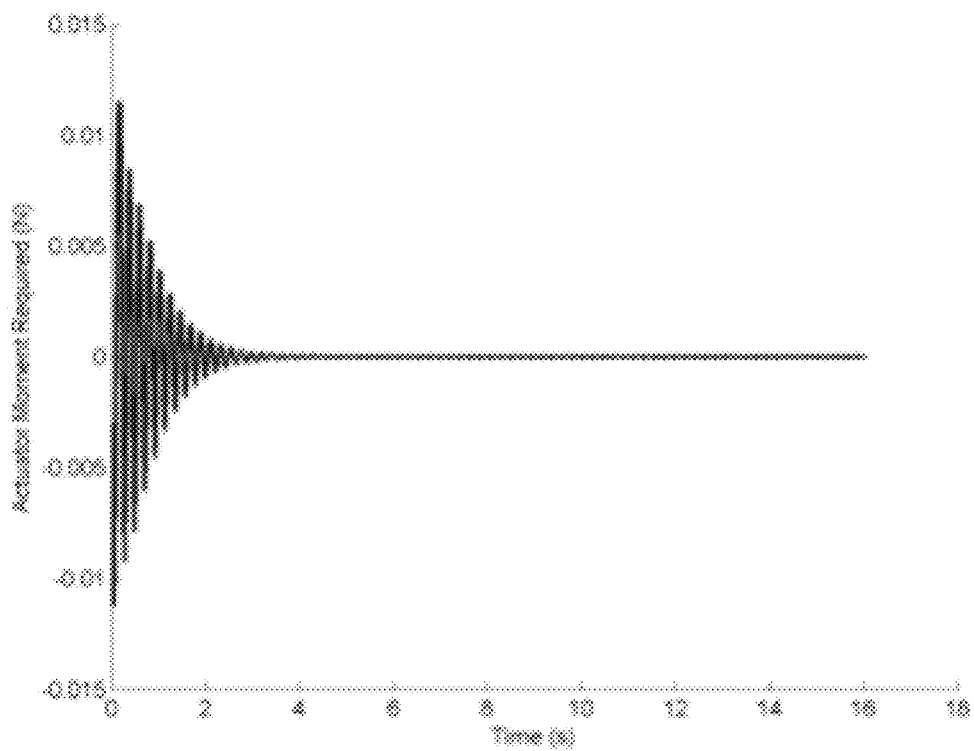
Figure 34F:
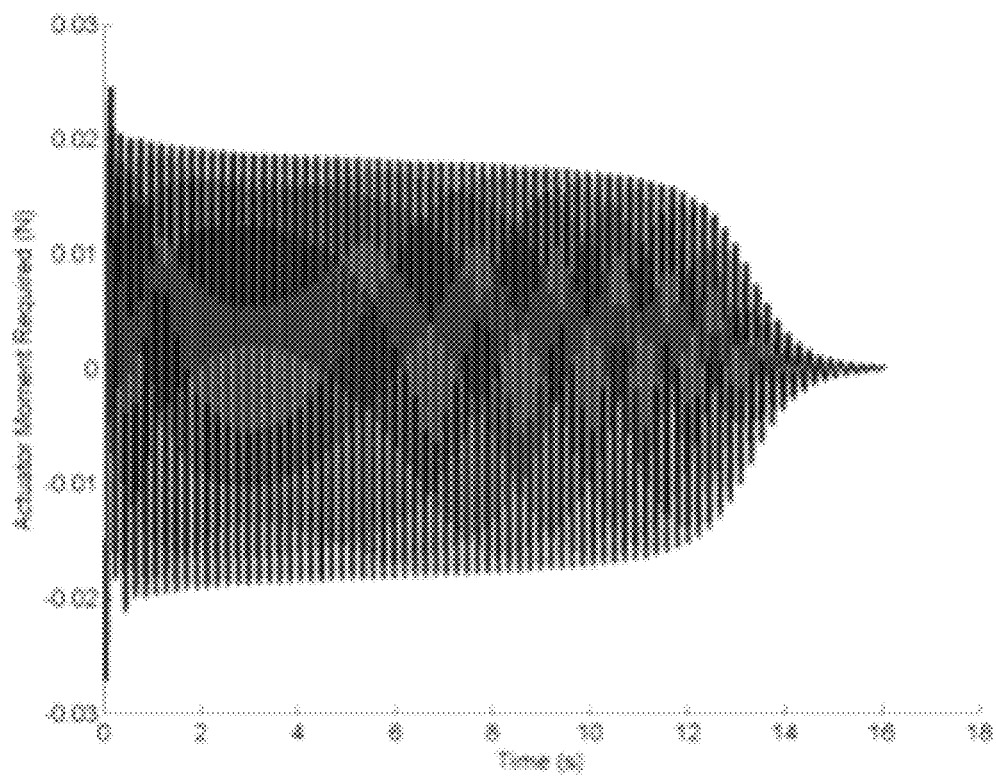

Successful suppression of the pitching LCO is demonstrated for the three initial excitation amplitudes in FIG. 33, whereas the corresponding time histories of the aerodynamic lift and moment produced by the actuator governed by the robust controller are shown in FIG. 34. As expected, both the time required to suppress LCO oscillations and the amplitudes of the forces and moments to be delivered by the actuator operating in the feedback-loop robust control system increase with higher initial excitation amplitudes. Similarly, the control authority requirements become more demanding at higher supercritical flight speeds, and generally new optimized sets of control gains should be determined.

A nonlinear robust control law for SJA-based LCO suppression in UAV wings is presented. The control law is rigorously proven to achieve global asymptotic regulation of the pitching and plunging displacements to zero in the presence of dynamic model uncertainty and parametric actuator uncertainty. Furthermore, the control law is shown via numerical simulation to compensate for un-modeled external disturbances (i.e., due to wind gusts and un-modeled effects). It is further shown that the robust control law can achieve suppression of LCO using minimal control effort.

The invention claimed is:

1. An unmanned aerial vehicle (UAV), comprising:
an airframe;
a plurality of synthetic jet actuators (SJA) affixed to the airframe, each SJA configured to selectively produce a stream of air in response to a control command input thereto, each SJA being represented by a mathematical model having at least two uncertain parameters;
a plurality of sensors configured to determine an operating condition of the UAV; and
a control system configured to provide the control command to each of the plurality of synthetic jet actuators based on the operating condition of the UAV and a control law, the control law including a constant estimate for each of the uncertain parameters in the mathematical model of each corresponding SJA;
wherein the control system controls at least one or both of the trajectory of the UAV and the vibration of the UAV by activating at least one of the plurality of SJA with the control command.

2. The unmanned aerial vehicle according to claim 1, wherein the plurality of SJA are selectively controlled by the control system to track a predetermined flight path, and
wherein the control law comprises:

$$v(t) = \frac{\hat{\theta}_1}{\hat{\theta}_2 - u_d(t)}$$

where $\hat{\theta}_1$ and $\hat{\theta}_2$ are constant estimates of uncertain parameters, and $u_d(t)$ denotes an auxiliary control term that incorporates the operating condition of the UAV.

3. The unmanned aerial vehicle according to claim 2, wherein the plurality of sensors measure the roll rate, pitch rate and yaw rate of the airframe as the operating condition.

4. The unmanned aerial vehicle according to claim 2, wherein:

$$u_d(t) = \hat{\Omega}^{\#}(\mu_0(t) - \mu_1(t))$$

where $\hat{\Omega}^{\#}$ denotes the pseudoinverse of $\hat{\Omega}$, and $\hat{\Omega}$ is a constant estimate of an uncertain matrix, and
where $\mu_0(t)$ and $\mu_1(t)$ are functions of roll, pitch, and yaw rate tracking errors.

5. The unmanned aerial vehicle according to claim 4, wherein:

$$\mu_0 = -(k_s + I_{m \times x})e(t) - (k_s + I_{m \times n})(0) - \int_0^t \alpha(k_s + I_{n \times n})e(\tau)d\tau$$

$$\mu_1 = \int_0^t \beta sgn(e(\tau))d\tau$$

where:
- e(t) is a trajectory tracking error expressed in degrees per second,
- $\hat{\Omega}$ is a constant estimate of the parametric uncertainty, and
- $k_s$, $\alpha$, $\beta$ are positive, constant, user-defined amplifier settings.

6. The unmanned aerial vehicle according to claim 1, wherein the plurality of SJA are selectively controlled by the control system to dampen limit cycle oscillations,
wherein the plurality of sensors measure at least one of pitching rate and plunging rate as the operating condition, and
wherein the control law comprises:

$$\dot{u} = \hat{B}^{-1}(-(k_s + I_{2 \times 2})r - \beta sgn(e_2(t))$$

where $k_s, \beta \in \mathbb{R}^{2 \times 2}$ denote constant, positive definite, diagonal control gain matrices, $I_{2 \times 2}$ denotes a 2×2 identity matrix, r and $e_2$ denote auxiliary regulation error measurements, and $\hat{B} \in \mathbb{R}^{2 \times 2}$ denotes a constant estimate of the uncertain input gain matrix B.

7. The control system according to claim 1, wherein the control law is configured to generate the control command for use in flight path tracking, the control law comprises:

$$v(t) = \frac{\hat{\theta}_1}{\hat{\theta}_2 - u_d(t)}$$

where $\hat{\theta}_1$ and $\hat{\theta}_2$, are constant estimates and $u_d(t) = \hat{\Omega}^\#(\mu_0(t) - \mu_1(t))$ where $\hat{\Omega}^\#$ denotes the pseudoinverse of $\hat{\Omega}$, and $\hat{\Omega}$ is a constant estimate of an uncertain matrix, and where $\mu_0(t)$ and $\mu_1(t)$ are functions of roll, pitch, and yaw rate tracking errors.

8. A method of controlling a micro air vehicle, comprising:
- measuring at least one of roll rate, pitch rate, yaw rate, pitching rate, and plunging rate;
- comparing the measured value with a desired reference value to determine an error;
- determining a control command voltage based on a control law, the control law comprising:

$$v(t) = \frac{\hat{\theta}}{\hat{\theta}_2 - u_d(t)}$$

where $\hat{\theta}_1$ and $\hat{\theta}_2$ are constant estimates and $u_d(t)$ is based on the error;
- applying the control command voltage to a synthetic jet actuator of a plurality of synthetic jet actuators; and
- emitting a flow of air from the synthetic jet actuator to adjust the trajectory of the micro air vehicle.

9. The method of controlling a micro air vehicle according to claim 8, wherein the method is free from time-varying adaptive parameter estimation algorithms.

* * * * *